US009185020B2

(12) United States Patent
Ezick et al.

(10) Patent No.: US 9,185,020 B2
(45) Date of Patent: Nov. 10, 2015

(54) SYSTEM, APPARATUS AND METHODS TO IMPLEMENT HIGH-SPEED NETWORK ANALYZERS

(75) Inventors: James Ezick, Canonsburg, PA (US); Richard A. Lethin, New York, NY (US); Jordi Ros-Giralt, Newport Beach, CA (US); Peter Szilagyi, Medina, NY (US); David E. Wohlford, Portland, OR (US)

(73) Assignee: Reservoir Labs, Inc., New York, NY (US)

( * ) Notice: Subject to any disclaimer, the term of this patent is extended or adjusted under 35 U.S.C. 154(b) by 1147 days.

(21) Appl. No.: 12/770,649

(22) Filed: Apr. 29, 2010

(65) Prior Publication Data

US 2010/0281160 A1 Nov. 4, 2010

Related U.S. Application Data

(60) Provisional application No. 61/174,325, filed on Apr. 30, 2009.

(51) Int. Cl.
*H04L 12/26* (2006.01)
*H04L 29/06* (2006.01)

(52) U.S. Cl.
CPC ............ *H04L 43/18* (2013.01); *H04L 63/1408* (2013.01); *H04L 63/1416* (2013.01)

(58) Field of Classification Search
CPC .. H04L 43/18; H04L 63/1408; H04L 63/1416
See application file for complete search history.

(56) References Cited

U.S. PATENT DOCUMENTS

| | | | |
|---|---|---|---|
| 5,442,699 A | 8/1995 | Arnold et al. | |
| 5,442,797 A | 8/1995 | Casavant et al. | |
| 5,613,136 A | 3/1997 | Casavant et al. | |
| 5,742,814 A | 4/1998 | Balasa et al. | |
| 5,920,854 A * | 7/1999 | Kirsch et al. | 1/1 |
| 5,953,531 A | 9/1999 | Megiddo et al. | |
| 6,006,033 A | 12/1999 | Heisch | |
| 6,018,735 A | 1/2000 | Hunter | |
| 6,038,398 A | 3/2000 | Schooler | |
| 6,131,092 A | 10/2000 | Masand | |

(Continued)

OTHER PUBLICATIONS

International Report on Patentability dated Mar. 31, 2011 for PCT Application No. PCT/US2009/057194.

(Continued)

*Primary Examiner* — Joe Chacko
(74) *Attorney, Agent, or Firm* — Goodwin Procter LLP

(57) ABSTRACT

Systems, apparatus and methods for the implementation of high-speed network analyzers are provided. A set of high-level specifications is used to define the behavior of the network analyzer emitted by a compiler. An optimized inline workflow to process regular expressions is presented without sacrificing the semantic capabilities of the processing engine. An optimized packet dispatcher implements a subset of the functions implemented by the network analyzer, providing a fast and slow path workflow used to accelerate specific processing units. Such dispatcher facility can also be used as a cache of policies, wherein if a policy is found, then packet manipulations associated with the policy can be quickly performed. An optimized method of generating DFA specifications for network signatures is also presented. The method accepts several optimization criteria, such as min-max allocations or optimal allocations based on the probability of occurrence of each signature input bit.

57 Claims, 20 Drawing Sheets

(56) References Cited

U.S. PATENT DOCUMENTS

| | | | |
|---|---|---|---|
| 6,279,113 B1* | 8/2001 | Vaidya | 726/23 |
| 6,327,699 B1 | 12/2001 | Larus et al. | |
| 6,338,057 B1* | 1/2002 | Weeks | 707/736 |
| 6,651,246 B1 | 11/2003 | Archambault et al. | |
| 6,754,650 B2 | 6/2004 | Cho et al. | |
| 6,772,415 B1* | 8/2004 | Danckaert et al. | 717/161 |
| 6,785,677 B1 | 8/2004 | Fritchman | |
| 6,792,546 B1* | 9/2004 | Shanklin et al. | 726/23 |
| 6,880,087 B1* | 4/2005 | Carter | 726/23 |
| 6,912,526 B2 | 6/2005 | Akaboshi | |
| 6,952,694 B2* | 10/2005 | Mathur et al. | 1/1 |
| 6,952,821 B2 | 10/2005 | Schreiber | |
| 7,086,038 B2 | 8/2006 | Cronquist et al. | |
| 7,185,327 B2 | 2/2007 | Scales | |
| 7,225,188 B1* | 5/2007 | Gai et al. | 1/1 |
| 7,260,558 B1 | 8/2007 | Cheng et al. | |
| 7,594,260 B2* | 9/2009 | Porras et al. | 726/13 |
| 7,634,566 B2 | 12/2009 | Turner et al. | |
| 7,757,222 B2 | 7/2010 | Liao et al. | |
| 8,087,010 B2 | 12/2011 | Eichenberger et al. | |
| 8,108,845 B2 | 1/2012 | Little et al. | |
| 8,230,408 B2 | 7/2012 | Eng | |
| 8,250,550 B2 | 8/2012 | Luszczek et al. | |
| 8,255,890 B2 | 8/2012 | Luszczek et al. | |
| 8,307,347 B2 | 11/2012 | Austin et al. | |
| 2002/0021838 A1 | 2/2002 | Richardson et al. | |
| 2003/0097652 A1 | 5/2003 | Roediger et al. | |
| 2004/1003476 | 2/2004 | Schreiber | |
| 2004/0068501 A1 | 4/2004 | McGoveran | |
| 2005/0114700 A1* | 5/2005 | Barrie et al. | 713/201 |
| 2006/0048121 A1 | 3/2006 | Blainey et al. | |
| 2006/0048123 A1 | 3/2006 | Martin | |
| 2006/0085858 A1* | 4/2006 | Noel et al. | 726/25 |
| 2007/1003336 | 2/2007 | Sakarda at al. | |
| 2007/0074195 A1* | 3/2007 | Liao et al. | 717/160 |
| 2007/0192861 A1* | 8/2007 | Varghese et al. | 726/23 |
| 2008/0010680 A1* | 1/2008 | Cao et al. | 726/23 |
| 2009/0037889 A1 | 2/2009 | Li et al. | |
| 2009/0083724 A1 | 3/2009 | Eichenberger et al. | |
| 2009/0119677 A1 | 5/2009 | Stefansson et al. | |
| 2009/0259997 A1 | 10/2009 | Grover et al. | |
| 2009/0307673 A1 | 12/2009 | Eichenberger et al. | |
| 2010/0050164 A1 | 2/2010 | Van De Waerdt et al. | |
| 2010/0162225 A1 | 6/2010 | Huang et al. | |

OTHER PUBLICATIONS

Ahmed et al, Synthesizing Transformations for Locality Enhancement of Imperfectly-nested Loops Nests, ACM ICS 2000, pp. 141-152.
Ahmed et al, Tiling Imperfectly-nested Loop Nests, IEEE 2000,14 pgs.
Aho et al, Compilers: Principles, Techniques, & Tools, 2nd Edition, 2006, pp. 173-186.
Aho et al, Efficient String Matching: An Aid to Bibliographic Search, Communications of the ACM, vol. 18, No. 6, Jun. 1975, pp. 333-340.
Aigner et al, An Overview of the SUIF2 Compiler Infrastructure, Computer Systems Laboratory, Stanford University, 1999, pp. 1-14.
Aldwairi et al, Configurable String Matching Hardware for Speeding Up Intrusion Detection, ACM SIGARCH Computer Architecture News, Vo. 33, No. 1, Mar. 2005, pp. 99-107.
Allen et al, Conversion of Control Dependence to Data Dependence, ACM 1983, pp. 177-189.
Ancourt et al, Scanning Polyhedra with DO Loops, Proceedings of the third ACM SIGPLAN symposium on Principles and practice of parallel programming, Apr. 21-24, 12 pgs. 1991.
Appel, A.W., Deobfuscation is in NP, Princeton University, Aug. 21, 2002, 2 pgs.
Ayers et al, Aggressive Inlining, PLDI '92 Las Vegas, NV, USA.
Ball et al, Branch Prediction for Free, Technical Report #1137, University of Wisconsin, 1993, 29 pgs.
Barak et al, On the (Im)possibility of Obfuscating Programs, Advances in Cryptology, CRYPTO 2001, vol. 2139, pp. 1-18.
Barthou et al, Maximal Static Expansion, International Journal of Parallel Programming, vol. 28, No. 3, 2000, 20 pgs.
Bastoul et al, Putting Polyhedral Loop Transformations to Work, INRIA, No. 4902, Jul. 2003.
Bastoul, C., Generating Loops for Scanning Polyhedra: CLooG User's Guide, First Version, Rev. 1.6, Apr. 8, 2004, pp. 1-30.
Bastoul, Code Generation in the Polyhedral Model is Easier Than You Think, Proceedings of the 13th International Conference on Parallel Architecture and Compilation Techniques, 2004.
Bastoul, Efficient Code Generation for Automatic Parallelization and Optimization, Proceedings of the Second International Symposium on Parallel and Distributed Computing, 2003.
Bednara et al, Synthesis for FPGA Implementations From Loop Algorithms, In Proceedings ofthe Int. Conf. on Engineering of Reconfigurable Systems and Algorithms (ERSA), Jun. 2001.
Berkelaar et al, The IpSolve Package, Sep. 21, 2007, pp. 1-9.
Bik et al, Implementation of Fourier-Motzkin Elimination, Technical Report 94-42, Department. of Computer Science, Leiden University, 1994.
Bondhugula et al, A Practical Automatic Polyhedral Parallelizer and Locality Optimizer, PDLI '08, Jun. 7-13, 2008.
Bondhugula et al, Affine Transformations for Communication Minimal Parallelization and Locality Optimization of Arbitrarily Nested Loop Sequences, OSU CSE Technical Report, OSU-CISRC-5/07/TR43, pp. 1-30.
Bondhugula et al, Automatic Mapping of Nested Loops to FPGAs, OSU, Mar. 19, 2007.
Bondhugula et al,A Practical and Fully Automatic Polyhedral Program Optimization System,OSU OSU-CISRC-10/07-TR70.
Boulet et al, (Pen)-ultimate tiling?, Laboratoire de l'Informatique du Parallelisme, Research Report No. 93-96, Nov. 1993, pp. 1-17.
Boulet et al, Scanning polyhedra without Do-loops, Parallel Architectures and Compilation Techniques, 1998, Proceedings 1998 International Conference on Oct. 12-18, 1998, pp. 4-11.
Briggs et al, Effective Partial Redundancy Elimination, Sigplan PLDI, Jun. 1994, pp. 1-12.
Brumley et al, Towards Automatic Generation of Vulnerability-Based Signatures, Proceedings of the 2006 IEEE Symposium on Security and Privacy, pp. 1-15.
Burger et al, Scaling to the End of the Silicon with EDGE Architectures, Computer, Jul. 2004, pp. 44-55.
Burke et al, Flow-Insensitive Interprocedural Alias Analysis in the Presence of Pointers, Lecture Notes in Computer Science, Proceedings from the 7th International Workshop on Languages and Compilers for Parallel Computing, vol. 892, 1995, 18 pgs.
Cifuentes, C., A Structuring Algorithm for Decompilation, XIX Conferencia Latinoamericana de Inforamatica, Buenos Aires, Argentina, Aug. 2-6, 1993, pp. 267-276.
Cifuentes,Structuring Decompiled Graphs, Department of Computer Science, University of Tasmania, 1994, 15 pgs.
Clauss et al, Automatic Memory Layout Transformations to Optimize Spatial Locality in Parameterized Loop Nests, ACM SIGARCH Computer Architecture News, vol. 28, No. 1, 2000, pp. 1-9.
Clauss et al, Deriving Formulae to Count Solutions to Parameterized Linear Systems using Ehrhart Polynomials: Applications to the Analysis of Nested-Loop Programs, Apr. 10, 1997.
Clearspeed—Accelerator Technology Primer, ClearSpeed Technology Primer, ClearSpeed Technology, Inc., 2006.
Clearspeed—ClearSpeed Programming Model: An introduction, ClearSpeed Technology Inc. 2007.
Clearspeed—ClearSpeed Programming Model: Card-side Libraries, ClearSpeed Technology Inc. 2007.
Clearspeed—ClearSpeed Programming Model: Optimizing Performance, ClearSpeed Technology Inc. 2007.
Clearspeed—CSX Processor Architecture Whitepaper, ClearSpeed Technology Plc., 2006.
Clearspeed—Introduction to ClearSpeed Acceleration, ClearSpeed Technology Inc., 2007, 27 pages.
Clearspeed—Introduction to ClearSpeed Acceleration, Powerpoint presentation, ClearSpeed Technology Plc, 2007, 133 pgs.
Clearspeed—Overview of Architecture: System Level (host) Architecture and ClearSpeed Architecture, ClearSpeed Technology Inc., 2007.

(56) References Cited

OTHER PUBLICATIONS

Clearspeed Introductory Programming Manual—The ClearSpeed Software Development Kit, ClearSpeed Technology Inc. 2007.
Clearspeed Programming Model: Case Study, ClearSpeed Technology Inc., 2007.
Clearspeed Technical Training: Software Development, ClearSpeed Technology Inc., 2007.
Click et al, A Simple Graph-Based Intermediate Representation, ACM IR'95, 1995, pp. 35-49.
Click, C., Global Code Motion Global Value Numbering, ACM SIGPLAN' 95, pp. 246-257, 1995.
Collard et al, Automatic Generation of Data Parallel Code, Proceedings of the Fourth International Workshop on Compilers for Parallel Computers, Dec. 1993.
Collard et al, Fuzzy Array Dataflow Analysis, ACM Principles and Practice of Parallel Programming, PPOpp'95, Jul. 1995, 10 pgs.
Collberg et al, A Taxonomy of Obfuscating Transformations, Technical Report 148, Department of Computer Science, University of Auckland, Jul. 1997. http://www.cs.auckland.ac.nz/Ccollberg/Research/Publications/CollbergThomborsonLow97a.
Collberg et al, Manufacturing Cheap, Resilient, and Stealthy Opaque Constructs, POPL 98, San Diego, CA 1998.
Cooper et al, Operator Strength Reduction, ACM Transactions on Programming Languages and Systems, vol. 23, No. 5, pp. 603-625, Sep. 2001.
Cooper et al, SCC-Based Value Numbering, CRCP-TR95636-S, Oct. 1995, pp. 1-12.
Cousot et al, Abstract Interpretation: A Unified Lattice Model for Static Analysis of Programs by Construction or Approximation of Fixpoints, Conference Record of the Fourth ACM Symposium on Principles of Programming Languages, Jan. 17-19, 1977, 16 pgs.
Cytron et al, Efficiently Computing Static Single Assignment Form and the Control Dependence Graph, Mar. 7, 1991, pp. 1-52.
Darte et al, Algorithm, Chapter 5: Parallelism Detection in Nested Loops, pp. 193-226.
Darte et al, Automatic parallelization based on multi-dimensional scheduling, Research Report No. 94-24, Laboratoire de l'Informatique de Parallelisme, 1994, pp. 1-34.
Darte et al, Lattice-Based Memory Allocation, ACM CASES'03, pp. 298-308, 2003.
Darte et al, Lattice-Based Memory Allocation, IEEE Transactions on Computers, vol. 54, No. 10, Oct. 2005, pp. 1242-1257.
Darte et al, Lattice-Based Memory Allocation, Research Report No. 2004-23, Apr. 2004, 1-43.
Darte et al, Revisiting the decomposition of Karp, Miller and Winograd, Parallel Processing Letters, 1995.
Ezick et al, Alef: A SAT Solver for MPI-Connected Clusters, Technical Report, Aug. 13, 2008, 21 pgs.
Featurier, Some efficient solutions to the affine scheduling problem Part I One-dimensional Time, Laboratoire MASI, Institute Blaise Pascal, Universite de Versailles St-Quentin, Apr. 23, 1993.
Feautrier et al, Solving Systems of Affine (In)Equalities: PIP's User's Guide, 4th Version, rev. 1.4, Oct. 18, 2003, pp. 1-25.
Feautrier, P., Array Expansion, Universite de Versailles St-Quentin, Jul. 1988, pp. 1-20.
Feautrier, P., Dataflow Analysis of Array and Scalar References, Int. J. of Parallel Programming, vol. 20, No. 1, 1991, pp. 1-37.
Feautrier, P., Parametric Integer Programming, RAIRO Operationnelle, vol. 22, Sep. 1988, pp. 1-25.
Feautrier, P., Some efficient solutions to the affine scheduling problem, Part II, Multidimensional Time, IBP/MASI, No. 92.78, 1992, pp. 1-28.
Ferrante et al, The Program Dependence Graph and Its Use in Optimization, ACM Transactions on Programming Languages and Systems, vol. 9, No. 3, Jul. 1987, pp. 319-349.
Franke et al, Compiler Transformation of Pointers to Explicit Array Accesses in DSP Applications, Institute for Computing Systems Architecture (ICSA), University of Edinburgh.
Gautam et al, The Z-Polyhedral Model, SIGPLAN Symp. on Principles and Practice of Parallel Programming, pp. 237-248, New York, NY, USA, 2007.
George et al, Iterated Register Coalescing, ACM Transactions on Programming Languages and Systems, vol. 18, No. 3, May 1996, pp. 300-324.
Ghosh et al, Cache Miss Equations: A Compiler Framework for Analyzing and Tuning Memory Behavior, ACM Transactions on Programming Languages and Systems, vol. 21, No. 4, Jul. 1999, pp. 702-745.
Griebl et al, Code Generation in the Polytope Model, pact, pp. 106, Seventh International Conference on Parallel Architectures and Compilation Techniques (PACT'98), 1998.
Griebl et al, Forward Communication Only Placements and their Use for Parallel Program Construction, University of Passau.
Griebl et al, Space-Time Mapping and Tiling: A Helpful Combination, Concurrency and Comput.: Pract. Exper. 2004, 16:221-246.
Griebl, Automatic Parallelization of Loop Programs for Distributed Memory Architectures, Fakultat fur Mathematik und Informatik, Jun. 2, 2004.
Griebl, On the Mechanical Tiling of Space-Time Mapped Loop Nests, Fakultat fur Mthemetik und Informatik, Universitat Passau, Germany.
Gu et al, Symbolic Array Dataflow Analysis for Array Privatization and Program Parallelization, Proceedings of Supercomputing '95, pp. 1-19, 1995.
Gustafson et al, ClearSpeed—Whitepaper: Accelerating the Intel® Math Kernel Library, ClearSpeed Technology Inc., 2006.
Heintze et al, Ultra-fast Aliasing Analysis Using CLA: A Million Lines of C Code in a Second, ACM SIGPLAN Notices, vol. 36, No. 5, 2001, 10 pgs.
Intel® QuickAssist Technology Accelerator Abstraction Layer (AAL), White Paper, Intel® Corporation, 2007, 8 pgs.
International Search Report and the Written Opinion dated Mar. 18, 2010 for PCT Application No. PCT/US2009/057194.
International Search Report and the Written Opinion of the International Searching Authority dated Jan. 17, 2008 for PCT Application No. PCT/US2007/72260.
Irigoin et al, Supernode Partitioning, Proceedings of the 15th Annual ACM SIGACT-SIGPLAN Symposium on Principles of Programming Languages, San Diego, CA, Jan. 1988.
JGAP Frequently Asked Questions, Sourceforge.net, pp. 1-61.
Jimenez et al, Register Tiling in Nonrectangular Iteration Spaces, ACM Transactions on Programming Languages and Systems, vol. 24, No. 4, pp. 409-453, Jul. 2002.
Kandemir et al, Optimizing Spatial Locality in Loop Nests using Linear Algebra, Proc. 7th International Workshop on Compliers for Parallel Computers, Sweden Jun. 1998.
Kelly et al, Code Generation for Multiple Mappings, frontiers, Fifth Symposium on the Frontiers of Massively Parallel Computation (Frontiers '95), 1995, pp. 1-11.
Kelly, W. A., Ph.D. Dissertation, Optimization within a Unified Transformation Framework, Dec. 8, 1996, pp. 1-89.
Kildall, G.A., A Unified Approach to Global Program Optimization, Annual Symposium on Principles of Programming Languages, Proceedings of the 1st annual ACM SIGACT-SIGPLAN symposium on Principles of programming languages, pp. 194-206, 1973.
Knoop et al, Partial Dead Code Elimination, Conference on Programming Language Design and Implementation, Proceedings of the ACM SIGPLAN 1994 conference on Programming language design and implementation, pp. 147-158, 1994.
Kodukula et al, An Experimental Evaluation of Tiling and Shacking for Memory Hierarchy Management, ACM ICS'99, 1999, pp. 482-491.
Lam, M., Software Pipeline: An Effective Scheduling Technique for VLIW Machines, Proceedings of the SIGPLAN '88 Conference on Programming Language Design and Implementation, Jun. 22-24, 1988, pp. 318-328.
Landi, W. Undecidability of Static Analysis, From ACM Letters on Programming Languages and Systems, vol. 1, No. 4, 1992, pp. 1-17.
Le Verge, H., A Note on Chernikova's Algorithm, Research Report, Jul. 27, 1994, pp. 1-25.

(56) References Cited

OTHER PUBLICATIONS

Lengauer et al, A Fast Algorithm for Finding Dominators in a Flowgraph, ACM Transaction on Programming Languages and Systems, vol. 1, No. 1, Jul. 1979, pp. 121-141.
Lethin et al, Mapping Loops for the ClearSpeed Processor Using the R-Stream Compiler, Feb. 4, 2008.
Lethin et al, R-Stream: A Parametric High Level Compiler, Reservoir Labs, Inc., 2 pgs.
Lethin et al, The R-Stream 3.0 Compiler, Dec. 18, 2007.
Lethin et al, The R-Stream 3.0 Compiler, Feb. 4, 2008.
Lethin et al, The R-Stream 3.0: Polyheadral Mapper, XPCA Review, Feb. 6, 2007.
Lethin, Software Tools to Optimize BMD Radar Algorithms to COTS Hardware—Final Report, Sep. 12, 2007.
Lim et al, Blocking and Array Contraction Across Arbitrarily Nested Loops Using Affine Partitioning, ACM PPOPP'01, 2001, pp. 1-10.
Lim et al, Maximizing Parallelism and Minimizing Synchronization with Affine Transforms, 24th Annual ACM SIGPLAN-SIGACT Symposium on Principles of Programming Languages, Paris, France, Jan. 1997.
Loechner et al, Precise Data Locality Optimization of Nested Loops, The Journal of Supercomputing, 21, pp. 37-76, 2002.
Maydan et al, Array Data-Flow Analysis and its Use in Array Privatization, ACM-20th PoPL-1, 1993, pp. 2-15.
McWhirter et al, Normalised Givens Rotations for Recursive Least Squares Processing, VLSI Signal Processing, VIII, 1995. IEEE Signal Processing Society [Workshop on], 1995, pp. 323-332.
Megiddo et al, Optimal Weighted Loop Fusion for Parallel Programs, ACM Symposium on Parallel Algorithms and Architectures archive Proceedings of the ninth annual ACM symposium on Parallel algorithms and architectures, pp. 282-291, 1997.
Meister et al, Optimizing and Mapping Tool Chain for FPGA Programming—Final Report Phase 1 SBIR Project, Sep. 28, 2007.
Meister et al, Static Software Tools to Optimize BMD Radar Algorithms to COTS Hardware, Quarterly Report #1, 2008, pp. 1-22.
Meister, B. Stating and Manipulating Periodicity in the Polytope Model. Applications to Program Analysis and Optimization, Universite Louis Pasteur Strasbourg, 2004, pp. 1-138.
Nookala et al, A Library for Z-Polyhedral Operations, Publication Interne No. 1330, IRISA, Publication No. 1330, May 2000, pp. 1-29.
Pop et al, Fast Recognition of Scalar Evolutions on Three-Address SSA Code, CRI/ENSMP Research Report, A/354/CRI, Apr. 1, 2004.
Pop et al, Induction Variable Analysis with Delayed Abstractions, ACM Transactions on Architecture and Code Optimization, vol. V, No. N, pp. 1-30, Aug. 2005.
Pugh, W. The Omega Test: a fast and practical integer programming algorithm for dependence analysis, ACM, Aug. 1992, pp. 1-19.
Quillere et al, Generation of Efficient Nested Loops from Polyhedra, 2000 Kluwer Academic Publishers, 2000.
Quillere et al, On Code-Generation in the Polyhedral Model, 10 pgs.
Quinton et al, on Manipulating Z-polyhedra, IRISA, Publication Interne No. 1016, Jul. 1996.
Quinton et al, The Mapping of Linear Recurrence Equations on Regular Arrays, Journal of VLSI Signal Processing, vol. 1, 35 pgs. (1989).
Rabinkin et al, Adaptive Array Beamforming with Fixed-Point Arithmetic Matrix Inversion using Givens Rotations, Proc. SPIE vol. 4474, 2001, pp. 294-305.
Rau, B. R., Iterative Modulo scheduling: An Algorithm for Software Pipelining Loops, ACM MICRO, 1994, pp. 63-74.
Reconfigurable Application-Specific Computing User's Guide, 2007, pp. 1-257.
Renganarayana, et al, A Geometric Programming Framework for Optimal Multi-Level Tiling, Conference on High Performance Networking and Computing, Proceedings of the 2004 ACM/IEEE conference on Supercomputing, 2004, 14 pgs.
Reservoir Labs, Inc., Optimizing and Mapping Tool Chain for FPGA Programming, Phase II Proposal, Proposal No. D2-0627, 40 pgs.
Reservoir Labs, Software Tools to Optimize BMD Radar Algorithms to COTS Hardware: Phase II Proposal, Topic No. MDA06-031, Proposal No. B2-1415.
Ros-Giralt et al, Generation of High-Performance Protocol-Aware Analyzers with Applications in Intrusion Detection Systems, Reservoir Labs, 8 pgs.
Ros-Girolt et al, Compilation and Optimization of Protocol Analyzers for High-Speed Network Intrusion Prevention, High Performance Networks / High-Speed Network Security Systems, Topic No. 41b, Reservoir Labs, Inc. 2009, pp. 1-54.
Sankaralingam et al, Distributed Microarchitectural Protocols in the TRIPS Prototype Processor, International Symposium on Microarchitecture, Proceedings of the 39th Annual IEEE/ACM International symposium on Microarchitecture, 2006, 12 pgs.
Schreiber et al, Near-Optimal Allocation of Local Memory Arrays, HP Laboratories Palo Alto, HPL-2004-24, Feb. 17, 2004.
Schwartz et al, VSIPL 1.1 API, 2002, pp. 1-739.
Seghir et al, Counting Points in Integer Affine Transformation of Parametric Z-polytopes, Research report, Universite Louis Pasteur, LSIIT (UMR CNRS 7005), Mar. 2007, pp. 1-24.
Seghir et al, Memory Optimization by Counting Points in Integer Transformation of Parametric Polytopes, ACM CASES'06, 2006, pp. 74-82.
Simpson, L. T., Thesis, Value-Driven Redundancy Elimination, Rice University, 1996, pp. 1-150.
Song et al, A Compiler Framework for Tiling Imperfectly-Nested Loops, Languages and Compilers for Parallel Computing, vol. 1863, 2000, pp. 1-17.
Springer et al, An Architecture for Software Obfuscation—Final Technical Report for Phase 1 SBIR, Jul. 30, 2007.
Springer et al, An Architecture for Software Obfuscation, PowerPoint presentation, 2007.
The Cell Roadmap, Published on PPCNUX at http://www.ppcnux.com/?q=print/6666.
The Polylib Team, Polylib User's Manual, Apr. 24, 2002, pp. 1-44.
Touati et a, Early Control of Register Pressure for Software Pipelined Loops, In Proceedings of the International Conference on Compiler Construction (CC), Warsaw, Poland, Apr. 2003. Springer-Verlag, 15 pgs.
Tu et al, Automatic Array Privatization, Lecture Notes in Computer Science, vol. 1808, 2001, 22 pgs.
Tu, P., Thesis, Automatic Array Privatization and Demand-Driven Symbolic Analysis, University of Illinois, 1995, pp. 1-144.
Udupa et al, Deobfuscation—Reverse Engineering Obfuscated Code, Proceedings of the 12th Working Conference on Reverse Engineering (WCRE'05), 10 pgs. 2005.
Vangal et al, An 80-Tile 1.28TFLOPS Network-on-Chip in 65Nm CMOS, ISSCC 2007, Session 5, Microprocessors/5.2, 3 pgs.
Vasilache et al, Alef: A SAT Solver for MPI-Connected Clusters, Reservoir Labs, 6 pgs.
Vasilache et al, Polyhedral Code Generation in the Real World, Compiler Construction, vol. 3923, 2006, 15 pgs.
Vasilache, Scalable Program Optimization Techniques in the Polyhedral Model, Thesis, Universite de Paris-SUD, UFR Scientifique d'orsay Inria Futures, Sep. 28, 2007.
Verdoolaege et al, Counting Integer Points in Parametric Polytopes using Barvinkok's Rational Functions, Algorithmica, 2007, pp. 1-33.
Wang, C., Dissertation—A Security Architecture for Survivability Mechanisms, University of Virginia, 2000, pp. 1-209.
Wegman et al, Constant Propagation with Conditional Branches, ACM Transactions on Programming Languages and Systems, vol. 13, No. 2, Apr. 1991, pp. 181-210.
Weise et al, Value Dependence Graphs: Representation Without Taxation, Annual Symposium on Principles of Programming Languages, Proceedings of the 21st ACM SIGPLAN-SIGACT symposium on Principles of programming languages, 1994, 14 pgs.
Whaley et al, An Efficient Inclusion-Based Points-To Analysis for Strictly-Typed Languages, Lecture Notes in Computer Science, vol. 2477, 2002, 16 pgs.
Wilde, D. K., A Library for Doing Polyhedral Operations, IRISA, Publication No. 785, 1993, pp. 1-48.

(56) References Cited

OTHER PUBLICATIONS

Wolf et al, A Data Locality Optimizing Algorithm, Proceedings of the ACM SIGPLAN '91 Conference on Programming Language Design and Implementation, Jun. 26-28, 1991, pp. 30-44.
Wu et al, Static Branch Frequency and Program Profile Analysis, 27th IEEE/ACM International Symposium on Microarchitecture (MICRO-27), 1994, 11 pgs.
Xue et al, Enabling Loop Fusion and Tiling for Cache Performance by Fixing Fusion-Preventing Data Dependences, Proceedings of the 2005 International Conference on Parallel Processing (ICPP'05), 2005, pp. 1-9.
Xue, On Tiling as a Loop Transformation, Department of Mathematics, Statistics and Computing Science, University of New England, Australia, 15 pgs.
Jonsson et al., "Verifying Safety Properties of a Class of Infinite-State Distributed Algorithms", Lecture Notes in Computer Science, 1995, vol. 939, pp. 42-53.
Mahajan et al., "Zchaff2004: An Efficient SAT Solver", LNCS, 2005, pp. 360-375.
International Preliminary Report on Patentability dated Oct. 27, 2011 for PCT Application No. PCT/US2010/031524.
International Search Report and Written Opinion dated Dec. 1, 2010 for PCT/US2010/033049.
Bondhugula et al, Toward Effective Automatic Parallelization for Mult par core Systems, In proceeding of 22nd IEEE International Symposium on Parallel and Distributed Processing, (IPDPS 2008). Miami, Florida USA, Apr. 14, 2008.
International Search Report and the Written Opinion dated Nov. 26, 2010 for PCT Application No. PCT/US2010/031524.
International Preliminary Report on Patentability dated Jan. 6, 2009 for PCT Application No. PCT/US2007/72260.
International Preliminary Report on Patentability dated Nov. 1, 2011 for PCT Application No. PCT/US2010/033049.
Aloul et al, Solution and Optimization of Systems of Pseudo-Boolean Consraints, IEEE Transactions on Comeuters, vol. 56, No. 1 0, Oct. 2007, pp. 1415-1424.
Buluc et al, Parallel Sparse Matrix-Matrix Multiplication and Indexing: Implementation and Experiments, SIAM Journal of Scientific Computing (SISC), 2012.
Chang et al, Parallel sparse supports for array intrinsic functions of Fortran 90, J. Supercomput, 18(3):305-339, 2001.
Davis, Direct Methods for Sparse Linear Systems. SIAM, 2006 (100 pgs.).
Franzie et al, Efficient Solving of Large Non-linear Arithmetic Constraint Systems with Complex Boolean Structure, JSAT, Journal on Satisftability, Boolean Modelling and Computation, vol. 1 (3-4): 2007, pp. 209-236.
Gundersen et al, Sparsity in higher order methods for unconstrained optimization, Optimization Methods and Software, 27(2):275-294 (2012).
Gustavson, Two Fast Algorithms for Sparse Matrices: Multiplication and Permuted Transposition, ACM Transactions on Mathematical Software, 4(3): 250-269, 1978.
Kolda et al, Scalable Tensor Decompositions for Multiaspect Data Mining, In ICDM 2008: Proceedings of the 8th IEEE International Conference on Data Mining, Dec. 2008, pp. 363-372.
Lathauwer et al, On the Best Rank-1 and Rank-$(R_1,R_2, \ldots, R_N)$ Approximation of Higher-Order Tensors, SIAM J. Matrix Anal. Appl., 21:1324-1342, Mar. 2000.
Lin et al, Efficient data compression methods for multidimensional sparse array operations based an the EKMR scheme, IEEE Trans. Comput., 52(12):1640-1646, (2003).
Lin et al, Efficient Representation Scheme for Multidimensional Array Operations, IEEE Transactions on Computers, 51:327-345, 2002.
Nieuwenhuis, Solving SAT and SAT Modulo Theories: From an Abstract Davis-Putnam-Logemann-Loveland Procedure to DPLL(T), Journal of the ACM (JACM) JACM vol. 53 Issue 6, Nov. 2006, pp. 937-977.
Vera et al, An Accurate Cost Model for Guiding Data Locality Transformations—Politecnica de Catalunya-Barcelona University—Sep. 2005.

* cited by examiner

FIG. 8

Optimal signature for Atphttpd attack:

f = bit1 & bit2 & bit3 & bit4 & ((!bit5 & bit6) | (!bit5 & bit7) | (bit8 & bit9))

bit1 : strcmp(METHOD,"GET") == 0;
bit2 : URI[0] == '/';
bit3 : URI[1] != '/';
bit4 : strstr(URI_sub[1], "../") == 0;
bit5 : isnotdir(URI_sub[1]);
bit6 : stat(URI_sub[1],ptr) < 0;
bit7 : stat(URI_sub[1]+"index.html",ptr) < 0;
bit8 : URI_sub[] == 0;
bit9 : stat("index.html",ptr) < 0;

FIG. 14

SYSTEM, APPARATUS AND METHODS TO IMPLEMENT HIGH-SPEED NETWORK ANALYZERS

CROSS REFERENCE TO RELATED APPLICATIONS

This application is related to and claims the benefit of priority to U.S. Provisional Application Ser. No. 61/174,325 entitled "COMPILATION AND OPTIMIZATION OF PROTOCOL ANALYZERS", filed Apr. 30, 2009, the entirety of which is hereby incorporated by reference.

GOVERNMENT INTEREST

Portions of this invention were made with U.S. Government support under contract/instrument Department of Energy SBIR DE-FG02-08ER85046 The U.S. Government has certain rights.

FIELD OF THE INVENTION

The present invention generally concerns high-speed network analyzers. More particularly, the invention concerns a system and its methods for identifying intelligent patterns within streams of data observed at high-speed rates.

BACKGROUND OF THE INVENTION

The process of developing technology often involves two parallel efforts: (1) the development of a new technology and (2) the development of peripheral tools for the performance analysis and behavior evaluation of the technology itself. While the field of computer science provides uncountable examples of technologies that have been developed hand in hand with such peripheral tools, two of these technologies have taken a pivotal place during the past fifty years: the computer and the Internet.

There exist at least two broad reasons for the need of analytical tools to measure the performance and behavior of Internet computing systems. First, at the early stages of development, systems are simple and their performance can usually be characterized through direct naked-eye observation. As the technology matures, its complexity increases, often to a point where its behavior is no longer easy to predict. The Internet provides a good example of such evolutionary transition. Its current behavior is both a function of (arguably) predictable computer behavior and unpredictable psychology-based human behavior. Such is the case that computer scientists have long tried to model its behavior borrowing tools from branches of math such as stochastic processes, game theory or even fractal and chaos theory. (A. B. Mackenzie, S. B. Wicker, Game theory in communications: motivation, explanation, and application to power control, IEEE Global Telecommunications Conference, 2001; M. E. Crovella, A. Bestavros, Self-similarity in World Wide Web Traffic: Evidence and Possible Causes, IEEE/ACM Transactions on Networking, 1996.) This evolutionary need for performance analysis tools arises in most of the technologies that achieve certain complexity.

Second, for the past fifty years, our economic and social superstructures have evolved to a point where almost any transaction (both economic and social) requires some form of involvement of the Internet and our computer systems. Key resources such as energy, water, communication or the stock market, to name a few, depend on the proper functioning of these two technologies. Such is the case that they are recognized as national security infrastructures subject to possible cyber attacks. (V. Paxson, Bro: A System for Detecting Network Intruders in Real-Time, Proceedings of the 7th USENIX Security Symposium, 1998.) To protect the well-being of our society, it is therefore crucial to dispose high-performance peripheral tools capable of analyzing the behavior of the networks to detect malicious usages.

Current architectures of these analysis tools are being driven to a breaking point by two independent challenges: first, as network data-rates increase, these tools are being overwhelmed by the quantity of computation they must perform to continuously analyze the network; second, as computer network systems become more sophisticated, the parsing of the network flows requires ever more complex traffic analysis heuristics that further stress the system's processing capacity.

Therefore there exists a need for a set of systems and methods that focus on the high-performance implementation of peripheral tools.

BRIEF SUMMARY OF THE INVENTION

Various provided embodiments include a system, apparatus, and methods for addressing many of the two challenges introduced above. In an exemplary embodiment, a method to generate data plane specifications of a network analyzer capable of running in a variety of hardware platforms is provided. The method is based on two core facilities: a high level protocol specification language (HLPSL) used to write input protocols and events specifications, and a compiler capable of translating such specifications into actual native code (the data plane specification) executable on the targeted hardware platform.

In another embodiment, a fast and slow path implementation of a component within the network analysis is provided. The separation of the implementation between fast and slow paths allows for the decoupling of those logical elements that are slow to execute but rarely used from those that are faster and commonly invoked. It is argued that this approach differs from previous work by providing scalability to large number of signatures, and hence that one exemplary application of the present invention is that of large systems supporting a large variety of analysis events.

In yet another embodiment, a packet dispatcher workflow is provided. The dispatcher provides a high-performance optimization framework in which a subset of the network analyzer functions can be offloaded onto a more specialized hardware and software facility. For instance, in an exemplary embodiment, the dispatcher is used to leverage dedicated DFA engines to search for regular expressions of interest in the flow of packets, offloading the network analyzer from such task.

In a further embodiment, a level 1 (L1) policy caching flowchart is provided that enables the following basic dispatcher behavior: upon arrival of a packet P, if a policy associated with P is found in the L1 cache, then execute it; otherwise, forward the packet to the network analyzer. This L1 cache provides yet another framework upon which high-performance optimizations can be implemented. For instance, the cache provides a facility to make early decisions on whether a specific flow requires any further processing or can be bypassed, yielding net savings of processing resources from the network analyzer.

In yet another embodiment, a workflow is presented which illustrates how a single protocol analyzer engine can be used to resolve a large number of signatures in parallel. Given a fixed number of supported protocols, this approach is shown to scale up with the number of signatures up to a certain saturation point.

In yet another embodiment, a method to translate and optimize signatures into binary decision diagrams (BDD) is provided. The method includes an optimization phase which accepts several optimization criteria. In one specific embodiment, a method is provided yielding min-max BDD cuts that can be run in parallel across multiple DFA engines. In another embodiment, a probabilistic method is provided that shows how knowledge of the probabilities of occurrence of the protocol header fields can be used to minimize the average computational cost of resolving a large set of signatures.

BRIEF DESCRIPTION OF THE DRAWINGS

Various embodiments of the present invention taught herein are illustrated by way of example, and not by way of limitation, in the figures of the accompanying drawings, in which:

FIG. 8 illustrates examples of regular expressions coming from different sources within the set of input specifications; according to a provided embodiment;

FIG. 14 illustrates an example of signature and its pseudo-code representation as the first stage in the process of generating a DFA specification;

Figure 1:
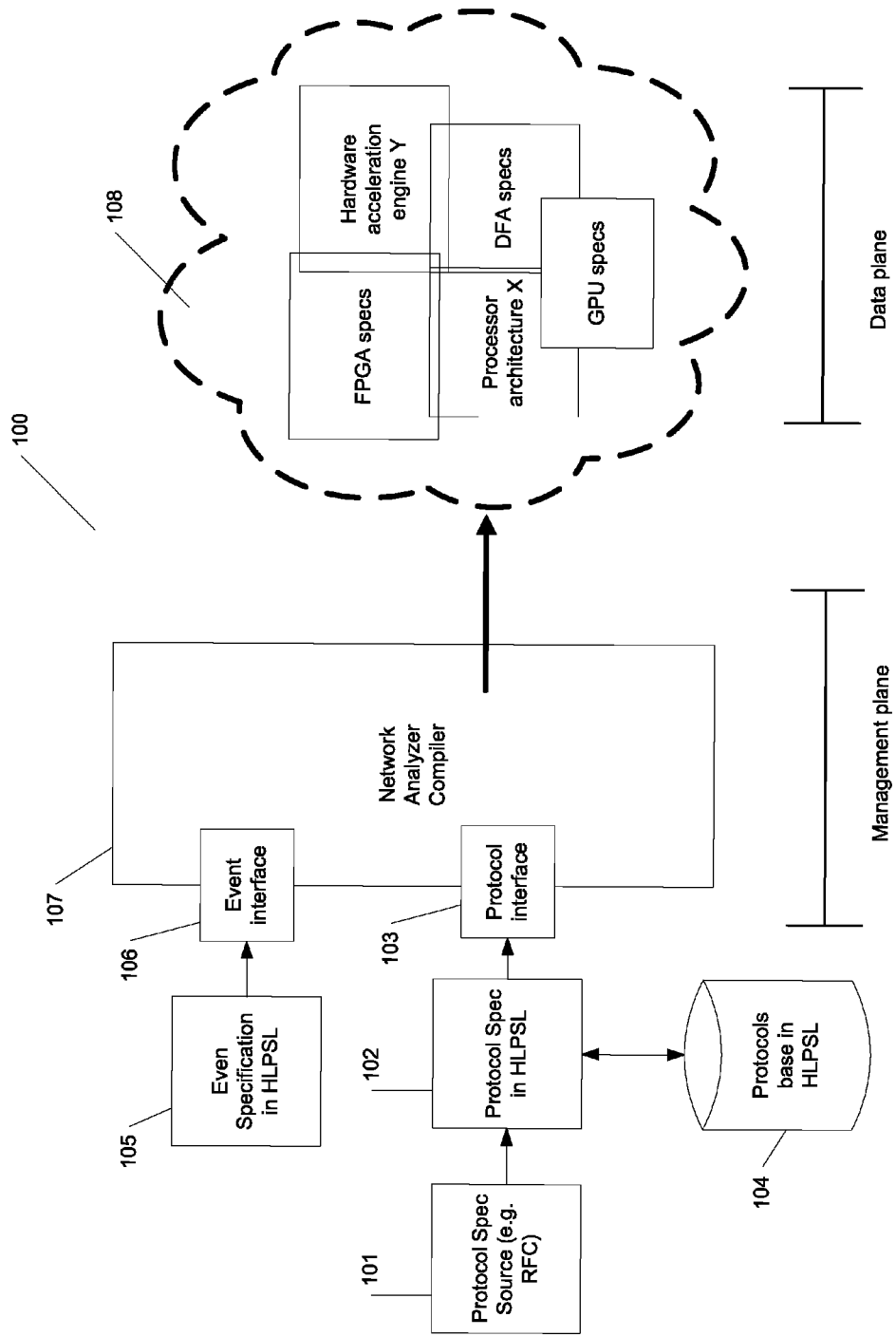
FIG. 1 is a block diagram of a provided apparatus, illustrating major components involved in the creation of a network analyzer data plane specification according to a provided embodiment.

It will be recognized that some or all of the Figures are schematic representations for purposes of illustration and do not necessarily depict the actual relative sizes or locations of the elements shown. The Figures are provided for the purpose of illustrating one or more embodiments with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature (s).

As is known in the art, a network may employ wireless, wired, and optical media as the media for communication. Further, in some embodiments, portions of network may comprise the Public Switched Telephone Network (PSTN). Networks, as used herein may be classified by range. For example, local area networks, wide area networks, metropolitan area networks, and personal area networks. Additionally, networks may be classified by communications media, such as wireless networks and optical networks. Further, some networks may contain portions in which multiple media are employed. For example, in modern television distribution networks, Hybrid-Fiber Coax networks are typically employed. In these networks, optical fiber is used from the "head end" out to distribution nodes in the field. At a distribution node communications content is mapped onto a coaxial media for distribution to a customer's premises. In many environments, the Internet is mapped into these Hybrid Fiber Coax networks providing high-speed Internet access to customer premises through a "cable-modem." In these types of networks, electronic devices may comprise computers, laptop computers, and servers to name a few. Some portions of these networks may be wireless through the use of wireless technologies such as a technology commonly known as "WiFi," which is currently specified by the IEEE as 802.11 and its variants, which are typically alphabetically designated as 802.11a, 802.11b, 802.11g, and 802.11n, to name a few.

Portions of a network may additionally include wireless networks that are typically designated as "cellular networks". In many of these networks, Internet traffic is routed through high-speed "packet-switched" or "circuit-switched" data channels that may be associated to traditional voice channels. In these networks, electronic devices may include cell phones, PDAs, laptop computers, or other types of portable electronic devices. Additionally, metropolitan area networks may include $3^{rd}$ and $4^{th}$ generation wireless networks employing an alternate wide area, or metropolitan area wireless technology. 3G and 4G wireless networks are currently specified by both of the $3^{rd}$ Generation Partnership Projects (3GPP and 3GPP2) Further personal area networks are known in the art. Many of these personal area networks employ a frequency-hopping wireless technology. Other personal area networks may employ a technology known as Ultra-Wideband (UWB). The hallmark of personal area networks is their limited range, and in some instances very high data rates. Since many types of networks and underlying communication technologies are known in the art, various embodiments of the present invention will not therefore be limited with respect to the type of network or the underlying communication technology.

For purposes of clarity the term network as used herein specifically includes but is not limited to the following networks: a wireless communication network, a local area network, a wide area network, a client-server network, a peer-to-peer network, a wireless local area network, a wireless wide area network, a cellular network, a public switched telephone network, and the Internet.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various non-transitory computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Referring to FIG. 1, which illustrates an exemplary embodiment of a network analyzer 100 for data plane specifications generation. As illustrated, the network analyzer 100 contains interfaces, a management plane and a data plane. In this embodiment, network analyzer 100 contains a network analyzer compiler 107 with an event interface 106 and a protocol interface 103. In some embodiments, event interface 106 is configured to receive an event specification 105. Additionally, protocol interface 103 is configured to receive a protocol specification 102.

In some embodiments, the inputs to the network analyzer compiler 100 are expressed in a high-level protocol specification language (HLPSL). The input to the protocol interface 103 originates from a protocol specification source 101. This specification can be expressed in a form different than the HLPSL. Examples of protocol source specifications are Internet Engineering Task Force (IETF) Request For Comments (RFCs) such as HTTP specification (R. Fielding, Hypertext Transfer Protocol—HTTP/1.1, Request for Comments RFC2616, 1999), or protocols specified in Backus-Naur Form (BNF). The protocol specification source is translated into an equivalent protocol specification 102 written in the HLPSL 102. The HLPSL defines a human readable grammar that is close to the language used to represent the protocol specification source 101, so that the process of translating one to another is generally straightforward. This translation process can be made manually or automatically via a simple domain-specific compiler.

Two examples of HLPSL that can be used within the scope of various embodiments are GAPAL (N. Borisov, D. J. Brumley, H. J. Wang, J. Dunagan, P. Joshi, and C. Guo, A Generic Application-Level Protocol Analyzer and its Language, Proceedings of the 14th Annual Network & Distributed System Security Symposium, March 2007) and BinPAC (R. Pang, V. Paxson, R. Sommer, L. Peterson, binpac: A yacc for Writing Application Protocol Parsers, Proceedings of ACM Internet Measurement Conference, October 2006). The protocol specification expressed in the HLPSL is used as an input to the protocol interface 103 in the network analyzer compiler module 107. Protocol specifications 102 written in HLPSL can be kept in storage 104 and be reused across different applications.

In some embodiments, the same HLPSL (or in some embodiments an extension of the same HLPSL) is used to describe the events that are relevant to the analysis. This event specification 105 is used as another input to the network analyzer compiler module 107 through event interface 106.

These two sets of specifications form the inputs to the network analyzer compiler 107, also referred as the management plane, which emits a set of data plane specifications for a particular data plane module 108 implementing the actual network analyzer. In an exemplary embodiment, the data plane specifications correspond to native binary code that runs on various hardware engines within the data plane module 108 such as processors, FPGAs, GPUs, ASICs, DFA engines or embedded network processors and hardware acceleration engines, among others.

In various provided embodiments the network analyzer compiler module 107 derives a data plane specification from a protocol specification 102 and an event specification 105. In some instances, the data plane specification contains a set of target events that are grouped or segmented into a fast path and a slow path. In these embodiments, the fast path is typically implemented by a single logical OR of at least two of the target events while the slow path implements each of the target events individually.

Figure 2:
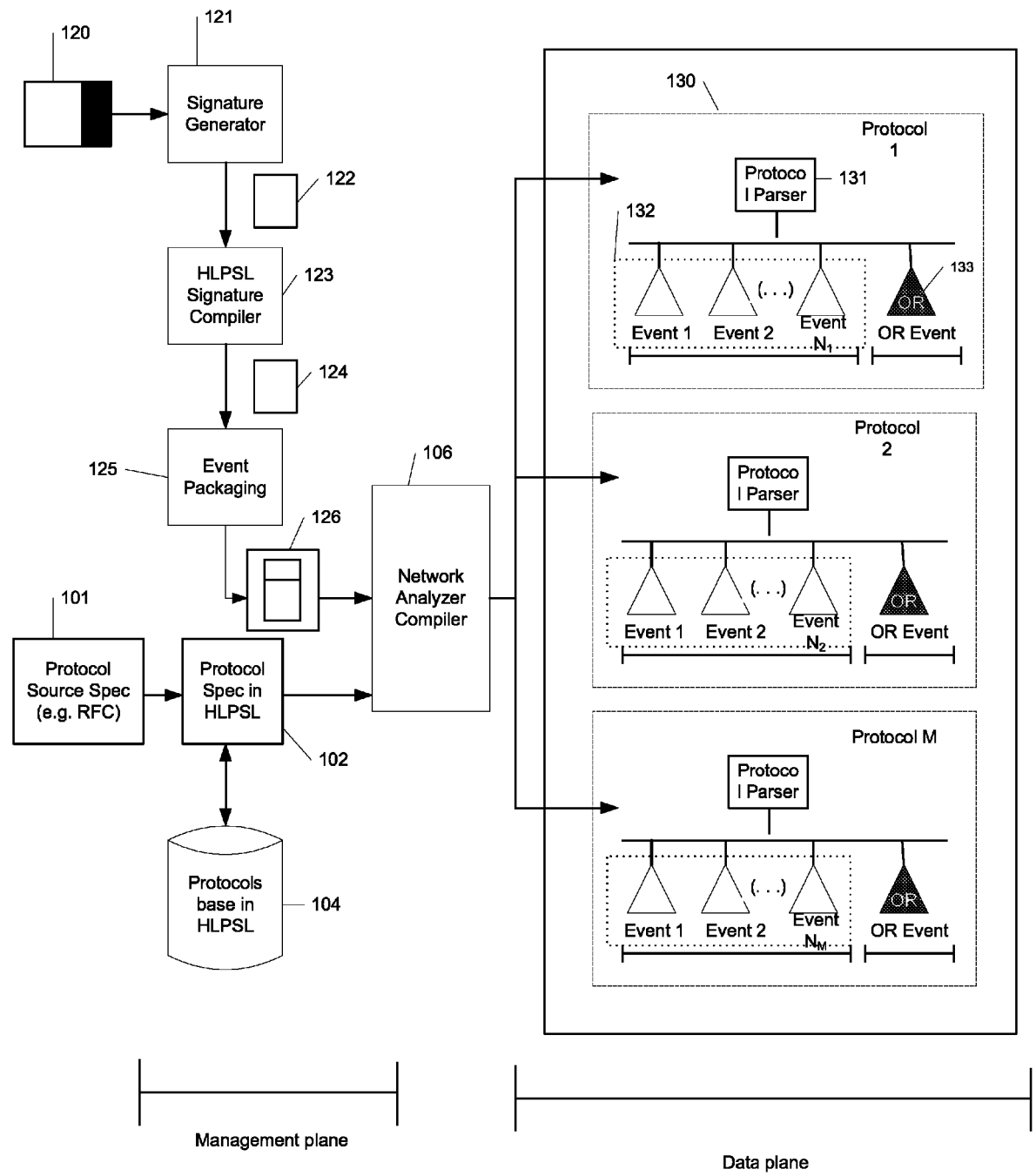
FIG. 2 is a block diagram illustrating some of the components forming the inputs and outputs of a provided network analyzer compiler embodiment.

In FIG. 2, an exemplary description of the blocks presented in FIG. 1 is presented. In one embodiment, the process of generating an event specification in the HLPSL is obtained from the analysis of the set of actions triggered by a network message. This process starts with receiving a network message or packet in 120, which is used to stress a signature generation module 121. In one embodiment, the signature generation module 121 can be implemented via a computer system which reports traces of the actions triggered by the input message. Such traces are then analyzed by the same signature generation module 121 to emit the actual signature 122. A signature 122 can be understood as a Boolean function that takes as input a network message and returns as output a TRUE value if some relevant action is triggered by the input message.

In one embodiment, the signature generation module 121 emits signatures that return a TRUE statement whenever the input network message attacks a vulnerability of a specific network system. Such signature can then be used by an intrusion detection system (IDS) to protect a network facility from a cyber-attack. An example of this type of signature generation module is presented in J. Newsome, D. Song, Dynamic Taint Analysis for Automatic Detection, Analysis, and Signature Generation of Exploits on Commodity Software, Proceedings of the Network and Distributed System Security Symposium, NDSS 2005.

In FIG. 2, the signature 122 is used as input to a HLPSL signature compiler 123, which is responsible for converting the signature into a specification 124 that conforms to the HLPSL grammar. An example of HLPSL signature compiler is BSC (J. Ros-Giralt, P. Szilagyi, J. Ezick, D. Wohlford, R. Lethin, Generation of High-Performance Protocol-Aware Analyzers with Applications in Intrusion Detection Systems, in Proceedings of SPIE, April 2010), which translates signatures expressed in VinE into BinPAC language. In general, the process will involve an additional stage (an event packing module 125) where the signature is packaged into an event specification 126 in module 125. In this stage, the set of actions that need to be triggered if the signature returns a TRUE statement are added to the HLPSL specification 124 to form the event specification 126. For instance, when used in the context of an IDS, the event can decide to drop, divert, or normalize a flow, among other actions, upon detecting that such flow is malicious (i.e., when the signature returns a TRUE value). The end result is a complete event specification 126 of an event using the HLPSL. Logically, we have that:

$$EVENT(126)=SIGNATURE(124)+\{ACTIONS\} \quad (125)$$

where {ACTIONS} is the set of actions that must be performed when the signature returns TRUE.

FIG. 2 provides additional detail on exemplary embodiments of the data plane module 108 output. Because events are expressed as actions triggered by Boolean functions, an opportunity exists to optimize the workflow by dividing it into a fast path 133 and a slow path 132. In some embodiments, the data plane module 108 consists of an arbitrary number of protocol analyzer modules 130. Each of the protocol analyzer modules 130 in turn may consist of a protocol parser 131 and a set of events, and each event is made of a signature and a set of actions. If a parser is capable of interpreting a specific protocol P, then it is able to parse any flow that is based on protocol P. For instance, an HTTP parser is able to parse all flows that are based on HTTP. In some provided embodiments, the event specification contains at least one target signature and an action to be invoked if and when the target signature is triggered or found within a data stream. In other embodiments the signature compiler translates a function from one source into one compatible with a conventional computer compiler system. In other provided embodiments, the event packing module 125 associates an equivalent signature with an action to be invoked when the signature is triggered.

Figure 3:
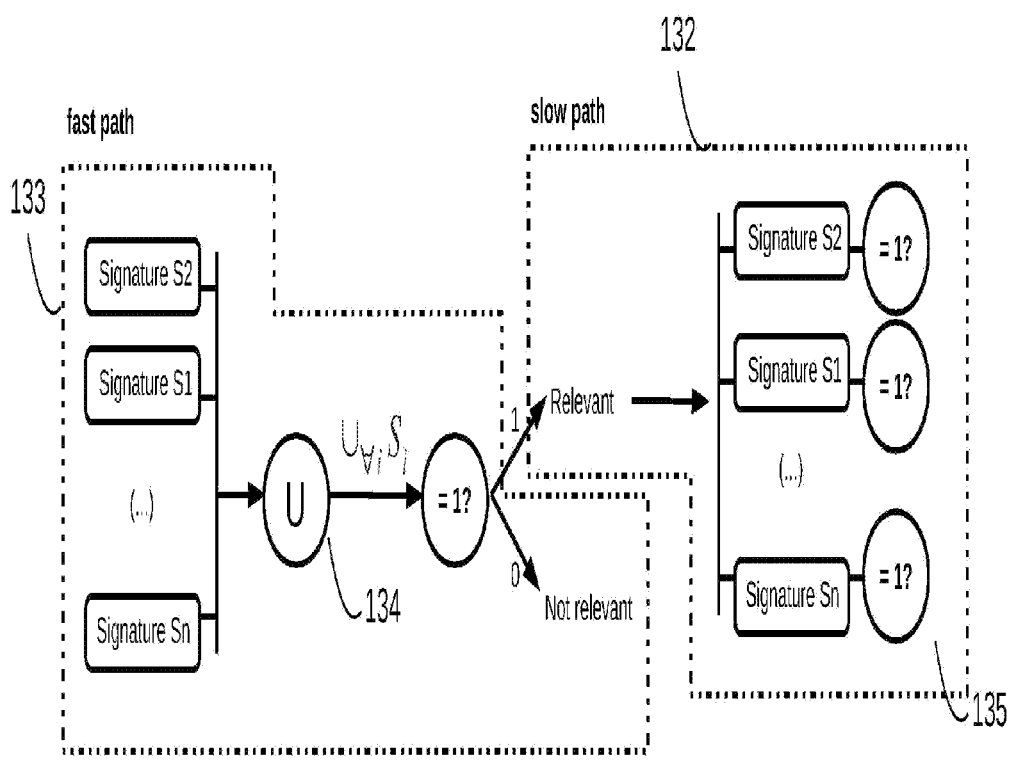
FIG. 3 is a block diagram illustrating the components forming the fast and slow path part of a network analyzer data plane specification embodiment.

FIG. 3 provides further detail on embodiments of the portions of FIG. 2 that refer to the fast path 133 and slow path 132 implementations. In an exemplary embodiment, a fast path 133 is defined as a signature equal to the OR of all the signatures associated with the events in that parser. When a message is received by the parser, it first invokes the OR signature 134. If the OR signature 134 returns FALSE, then the message is irrelevant to the analysis (since all the signatures must return FALSE) and no further action needs to be carried out. Otherwise, if the OR signature 134 returns TRUE, then the slow path 132 is invoked. The slow path 132 consists of the execution of each signature 135 separately. In the slow path 132, the system will execute the event actions associated with those signatures that return TRUE.

The fast path 133 implementation improves the performance of the system if the following holds:

1. with a large probability, the fast path 133 returns FALSE; and
2. it is faster to execute the fast path 133 than the slow path 132.

Notice that if the first condition does not hold, then for most of the cases the system will need to invoke both the fast path 133 and the slow path 132, rendering the fast path 133 redundant. The second condition is also required to be consistent with the definition of fast path 133 and slow path 132. It is observed that in the particular embodiment of an IDS, the above conditions are generally satisfied. In an IDS, in average only a small percentage of the traffic corresponds to an attack. (Even though there might exist certain windows of time for which malicious traffic might come in bursts). In addition, notice also that in general the OR signature 134 can be resolved faster than each signature separately because typically signatures 135 will expose redundancies that the OR operator can simplify away.

Figure 4:
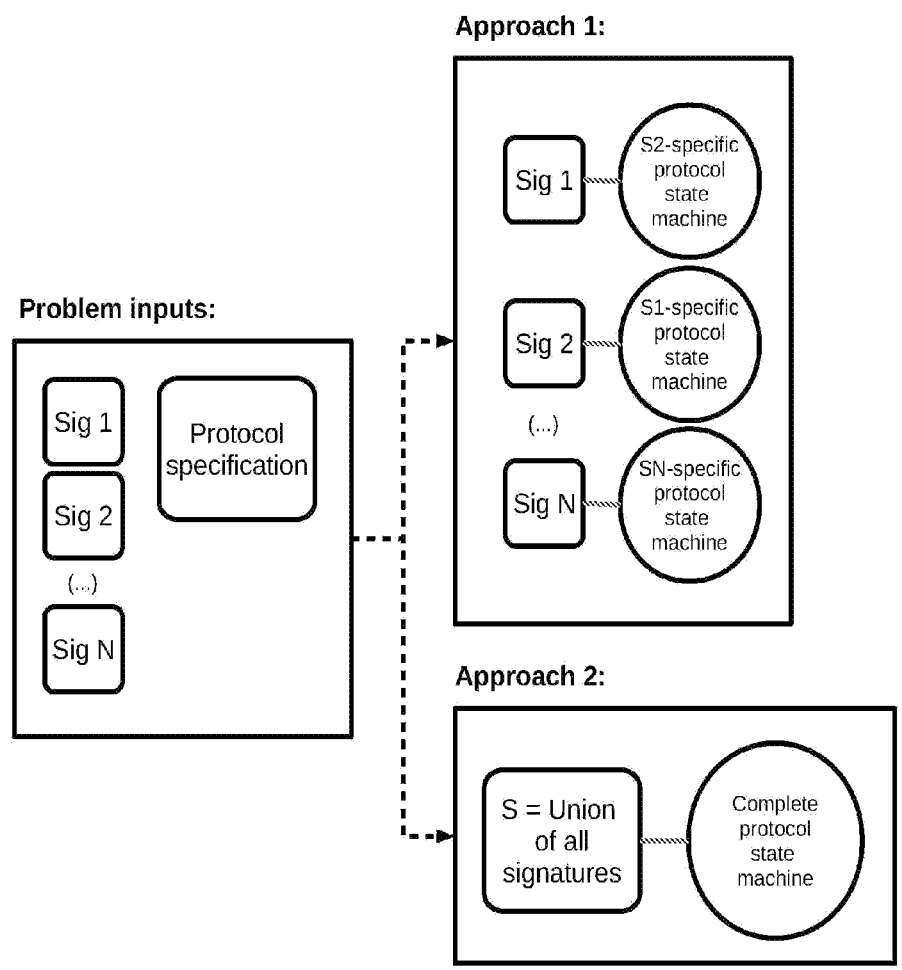
FIG. 4 is a schematic diagram showing the inputs to a family of protocol analysis problems and two different provided methods.

FIG. 4 compares embodiments of the protocol analyzer architecture in the present invention and that of previous work (N. Schear, D. R. Albrecht, N. Borisov, High-speed Matching of Vulnerability Signatures, Symposium on Recent Advances in Intrusion Detection, September 2008). While the focus of this previous work was in the design of high-speed intrusion detection systems, the comparison can be generalized to the case of a network traffic analyzer configured with real time events that are triggered when traffic satisfies certain conditions parameterizable through Boolean functions (the signatures). In the following explanation, we will refer to this previous work as approach 1, whereas the present invention will be referred as approach 2. The motivation of this comparison is as follows. Efficient execution of events is an important aspect in the design of high performance network analyzers, especially in scenarios where one needs to protect network trunks handling large amounts of traffic (e.g., 100 Gbps). The situation is further exacerbated by the fact that real deployments need to typically handle on the order of thousands of events/signatures. While traditional network traffic analyzers based on pattern-matching can be executed in parallel using hardware optimizations such as embedded DFA engines, no equivalent solution has been produced for the processing of protocol parsers with events/signatures in parallel.

In previous work (FIG. 4 approach 1), relevant results were presented on the acceleration of signatures based on the independent optimization of each signature's protocol parser. This approach focuses on the optimization of the protocol parser of each signature by removing from the protocol definition those elements that are not relevant to the processing of the signature. In embodiments of the present invention (FIG. 4 approach 2), in contrast, as the number of events (and therefore signatures) that need to be handled increases, the parts of the protocol parser that can be omitted become fewer, since a larger variety of signatures will require in general a larger variety of parsed information. In the limit, when the number of signatures is very large, one should expect the need to process most of the protocol elements carried by a flow in order to resolve all the signatures. Therefore, the savings introduced by approach 1 will tend to decrease as the number of signatures increase. In various embodiments of the present invention, instead of optimizing each signature separately with its own protocol parser, the union of all of the signatures is optimized; this allows both the simplification of redundancies across signatures and the execution of all the signatures in parallel leveraging one single complete protocol parser. Further, as it will be described later in a separate embodiment, this approach allows for the parallel execution of the signatures using DFA (deterministic finite automata) hardware engines. In summary, both solutions (approach 1 and approach 2) have their practical applications and market niches: approach 1 is likely to operate well in the case of low number of signatures, whereas approach 2 will tend to do better as the number of signatures increases.

Figure 5:
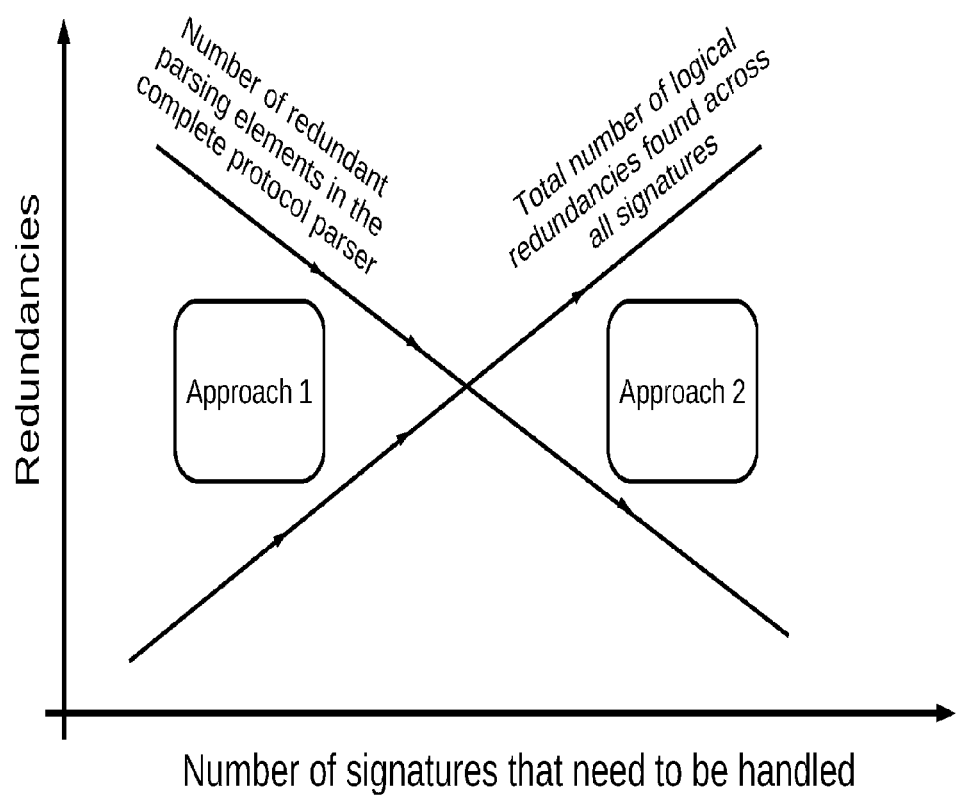
FIG. 5 illustrates the performance of two different provided methods.

FIG. 5 summarizes the trade-off relationship between approach 1 and approach 2. When the number of signatures is low, using a complete protocol parser to resolve the signatures leads to large number of unnecessary (redundant) parsed elements while the number of redundancies across signatures is low. In this situation, approach 1 will tend to perform well. On the other hand, when the number of signatures is high, nearly all the logic of the protocol parser will be used (yielding few redundant parsing elements) while the number of redundancies across signatures will increase. In this second scenario, the present invention (approach 2) will tend to outperform approach 1.

Figure 6:
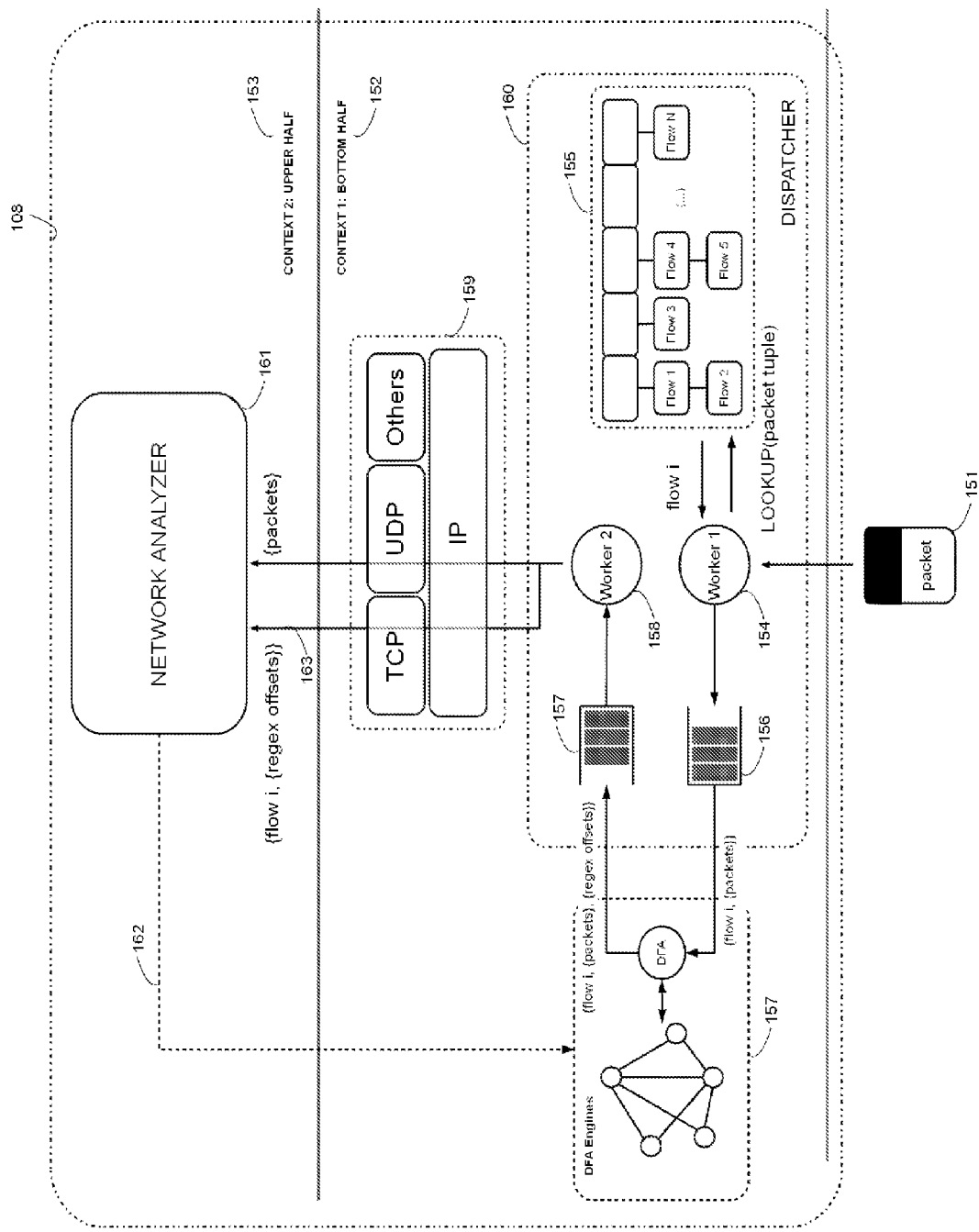
FIG. 6 is a block diagram illustrating some of the components forming an embodiment of a data plane specification of the network analyzer concerning the front-end dispatcher.

In another exemplary embodiment of the present invention, FIG. 6 presents an implementation of the data plane module 108 introduced in FIG. 1. The figure describes the architecture and processing of an incoming packet 151 from the time it is received at the physical layer to the time it is delivered to the network analyzer at the application layer. In some embodiments, the workflow distinguishes two contexts: the bottom half (context 1, reference 152) and the upper half (context 2, reference 153). This is done to optimize the matching of tasks and resources. For instance, in one embodiment, the bottom half 152 offers a more limited set of resources and functionalities while delivers its services at high performance, whereas the upper half 153 provides a richer set of functionalities at a lower performance. While not specific to, in an exemplary embodiment this infrastructure is mapped onto the operating system of a computer, where the bottom half 152 corresponds to the kernel OS and the upper half 153 corresponds to user space.

In what follows, and throughout the description of the various provided embodiments, the terms connection and flow are used interchangeably. Upon arrival, a packet 151 is intercepted from the main flow by a dispatcher 160. In one embodiment, the dispatcher 160 can be implemented as a driver module that is dynamically inserted to the system. The packet 151 is first handed to a first worker 154 "worker 1". Using the packet's 151 IP connection tuple (defined by the IP source and destination address, transport layer source and destination port, and protocol number), the first worker 154 performs a look up operation onto a table of flows in memory block 155 to obtain the connection state "flow" associated with the packet 151. Next, the first worker 154 creates a working item made of the packet buffer and flow i and inserts it to a working queue 156. In general, the first worker 154 can decide to coalesce multiple packets that belong to the same connection into a scatter-gather list of packets, {packets}, and queue it together with the flow state, {flow i, {packets})}, as indicated in FIG. 6. To ensure a correct processing, if a flow requires in-order packet delivery, the first worker 154 will also perform the task of packet re-ordering (for instance in the case of TCP flows).

A deterministic finite automata (DFA) engine 157 is used to process each working item {flow i, {packets}} to extract the relevant regular expressions found within the packet 151. In some embodiments, the DFA engines 157 are loaded at booting time with a set of specifications (the DFA graphs) that define which regular expressions are of interest to the analysis. In one embodiment, this loading operation is triggered by the network analyzer using an out-of-band control channel 162 and such facility can also be used to dynamically modify the set of DFA specifications. In yet another provided implementation, the DFA engines 157 is implemented in hardware, providing a facility to process regular expressions in parallel. Depending on the type of application, such dedicated facility can save substantial amount of computational work from the system's core processors. For instance, previous work by the authors of the present invention (J. Ros-Giralt, P. Szilagyi, J. Ezick, D. Wohlford, R. Lethin, "Generation of High-Performance Protocol-Aware Analyzers with Applications in Intrusion Detection Systems," SPIE Cyber Security, Situation Management, and Impact Assessment Conference, April 2010, which is incorporated by reference in its entirety) shows that for a typical HTTP request message, offloading of regular expressions onto hardware DFA engines 157 can save about half the total amount of cycles spent by the CPU in processing the complete message, potentially doubling the throughput of the system. In another embodiment, the DFA engines 157 are implemented in software. While such approach does not benefit from the parallel and optimized nature of the hardware DFA engines 157, the system still benefits from doing this processing up front, for instance by enabling early filtering policies that can save future cycles. This will be described in more detail in a separate embodiment.

The DFA engines 157 return the offsets of the regular expressions found within the scatter-gather list of packets, putting a working item of the form {flow i, {packets}, {regex offsets}} back to a queue of results. A second worker 158 "Worker 2" pulls elements from this queue and delivers them back to the system's IP stack 159. The tuple {flow i, {packets}, {regex offsets}} is ultimately delivered to the network analyzer 161. In an exemplary embodiment, the control data {{flow i}, {regex offsets}} is delivered using a separate control channel 163. The network analyzer 161 can then process the packets 151 using the control information provided by the tuple {{flow i}, {regex offsets}}.

Figure 8:
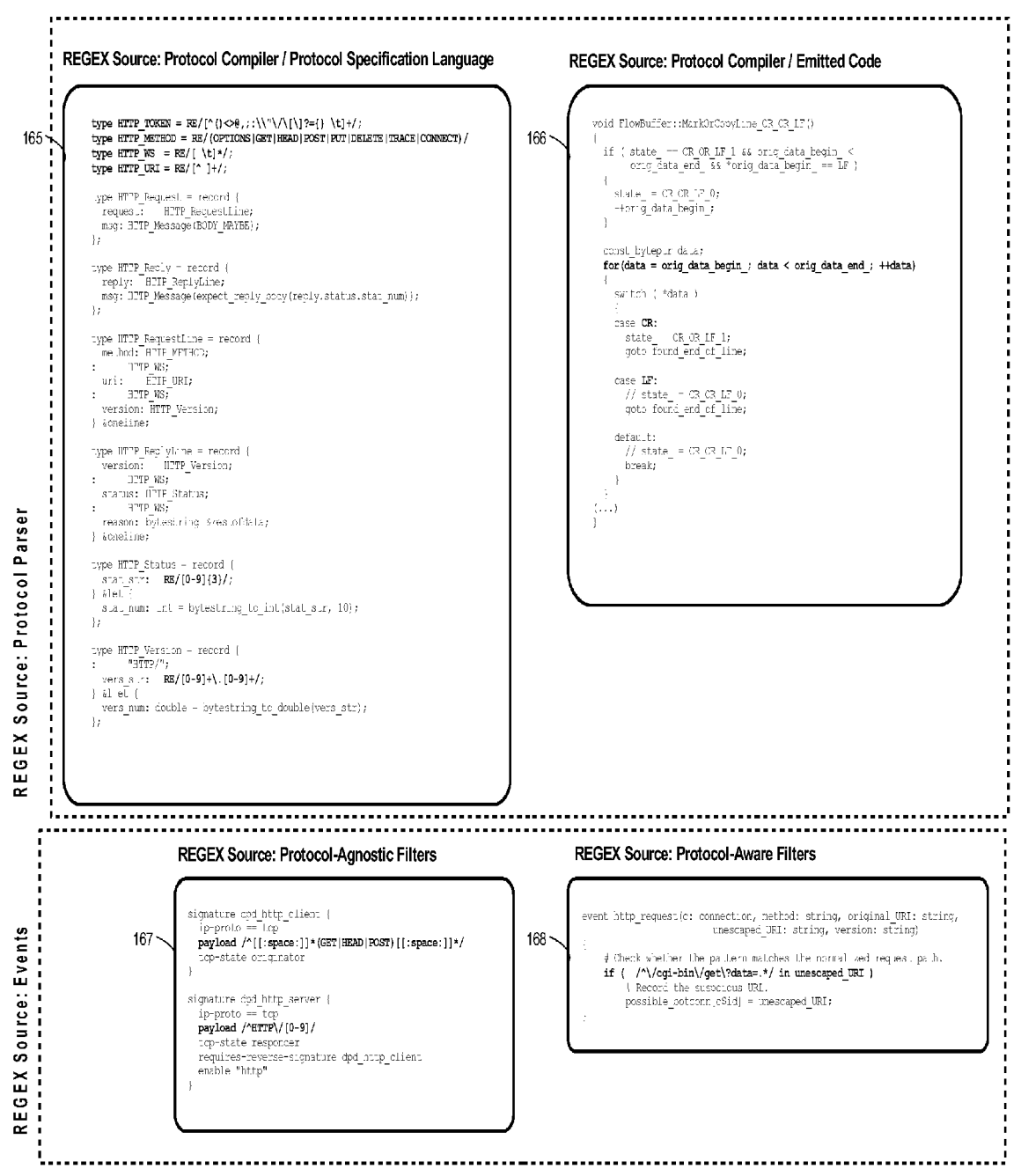

In one embodiment, DFA specifications are automatically generated at compile-time by the network analyzer compiler (107, FIG. 1). The network analyzer compiler 107, upon reading the input HLPSL specifications, extracts the relevant regular expressions and generates their corresponding DFA specification. Such regular expressions can come from multiple sources; FIG. 8 presents examples of regular expressions that can be offloaded using this method for the case in which the HLPSL is Bro/BinPAC (R. Pang, V. Paxson, R. Sommer and L. Peterson, binpac: A yacc for Writing Application Protocol Parsers, Proc. ACM IMC, October 2006). The figure provides four examples:

1. Regular expressions obtained from the HLPSL (reference 165): these type of regular expressions are typically explicitly defined following the HLPSL grammar; for instance, in 165, they are defined via the expression "RE/{regular expression}/".

2. Regular expressions obtained from the code emitted by the compiler 166: these regular expressions can be implicitly identified from the code emitted by the compiler, the bold line defines the search for a regular expression equal to carrier return (CR) and line feed (LF).

3. Regular expressions obtained from protocol-agnostic filters 167: these regular expression can typically be identified from filters that are based on plain pattern matching or minimal protocol interpretation; for instance, in 167, these regular expressions are defined by the expressions "payload/{regular expression}/".

4. Regular expressions obtained from protocol-aware filters 168: these regular expressions can be found in filters that are protocol intelligent; for instance, 168, these regular expressions can be defined with expressions such as "if ({regular expression} in buffer)"

In one embodiment, the network analyzer compiler 107 is capable of identifying a complete taxonomy of regular expressions such as the one presented above and generates at compile-time the DFA specifications.

Figure 7:
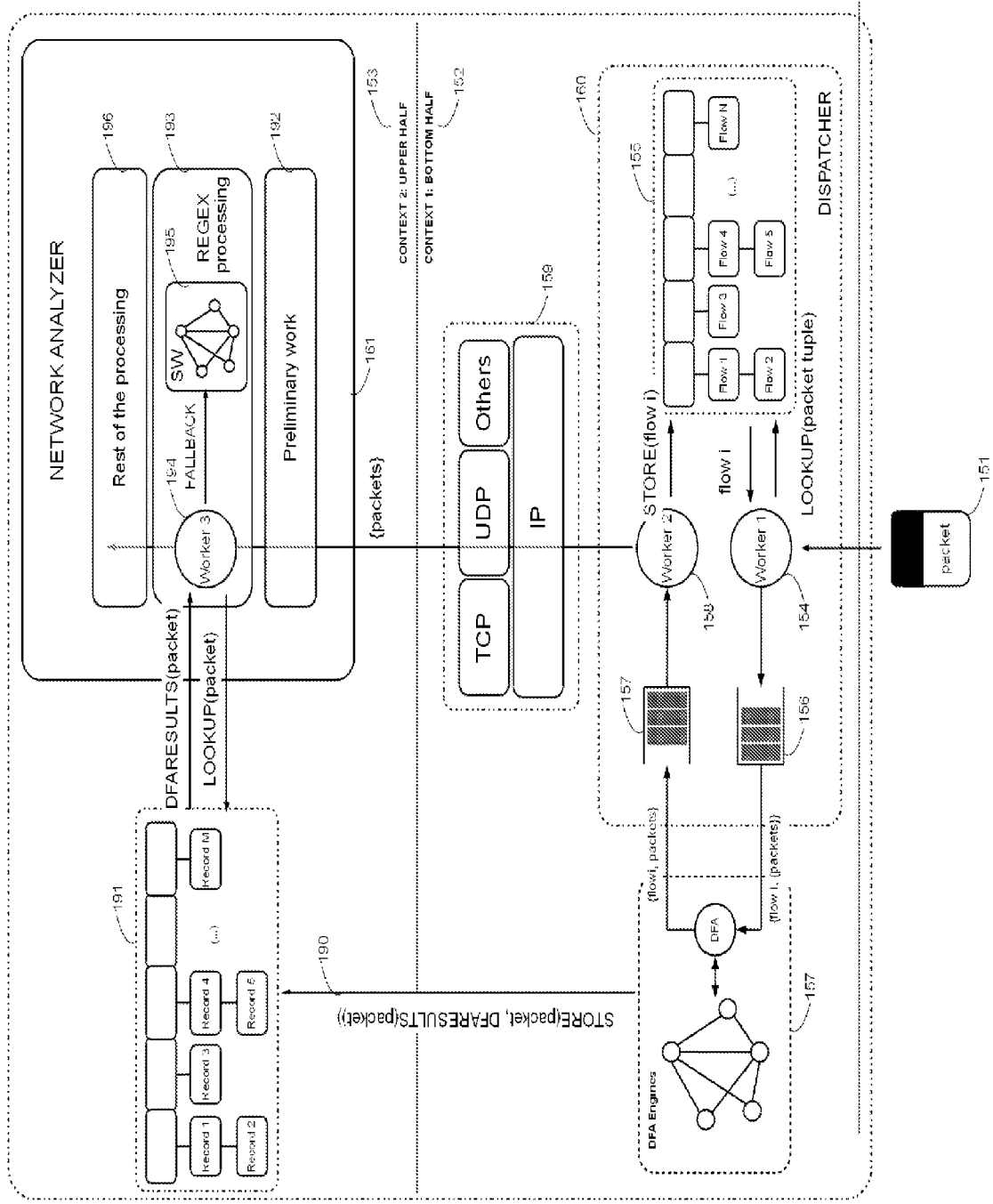
FIG. 7. is a block diagram illustrating some of the components forming an embodiment of a data plane specification of the network analyzer concerning the front-end dispatcher.

Another provided embodiment, illustrated in FIG. 7, is a method that can be implemented within the scope of the dispatcher module 160 presented in FIG. 6. These embodiments (FIG. 7) include apparatus and methods to implement the passing of control data from the dispatcher to the network analyzer. The data flow for this method starts in block 157 (the remaining data flow previously described with respect to FIG. 6). The DFA engines 157 process the incoming data to obtain the set of offsets where the regular expressions of interest are found. One objective is to convey these offsets to the network analyzer in an efficient way. To that end, a cache table 191 is used to store the control information. In some embodiments this cache is indexed with the memory pointers of the packets scanned by the DFA engines. For each scanned packet, the DFA engines store in the cache a record containing the offsets of the regular expressions. Following this procedure, a STORE operation 190 takes as input parameters the pointer to the packet and the results of the DFA engines (the offsets). A record containing these offsets is created and put in the cache using the pointer as the index to store (and later retrieve) the record.

In a one embodiment, the cache can have limited storage capacity. If such limit is reached, the STORE operation is allowed to fail or, alternatively, a STORE operation can cause an existing record to be dropped from the cache. In these situations, certain packets may not have a corresponding record in the cache. Hence, certain look up operations may also fail (what is known as a cache miss). In a particular configuration, this storage capacity can be set to infinite or, more practically, to the maximum storage capacity given by the system. The cache can also be maintained by a variety of garbage collection or record replacement heuristics as is done in traditional caching methods. In yet another embodiment, the cache can be implemented using high performance storage access algorithms including, but not limited to, hash tables or bloom filters.

Building on the same data path previously described above, packets arrive at the network analyzer 161 where, without loss of generality, the work is partitioned into three stages: a preliminary work stage 192, a regular expression processing stage 193 and a third stage 196 where the remaining tasks take. Upon arriving at the regular expression processing stage 193, a packet is processed by a worker 194 which performs a LOOKUP operation onto the cache 191. The LOOKUP operation passes as argument the pointer to the packet, which is then used as the index to retrieve the record associated with such packet. If the LOOKUP operation returns a record (cache hit), then the worker uses the offsets found in it (if any) to identify the location of the regular expressions of interest in the packet. Otherwise, if no record is found (cache miss), the worker falls back to the normal path and invokes the software regular expression module 195.

The usage of a caching system to convey control information from the dispatcher to the network analyzer provides two key advantages: on one hand, portability and interoperability are greatly enhanced, since all the control logic is kept separate from the rest of the system blocks and, with only a few simple hooks, the control path can be easily attached to the dispatcher and the network analyzer; on the other hand, this comes at no (or negligible) performance cost, since the cache can be implemented using traditional high-performance storage access algorithms such as hash tables or bloom filters.

Figure 9:
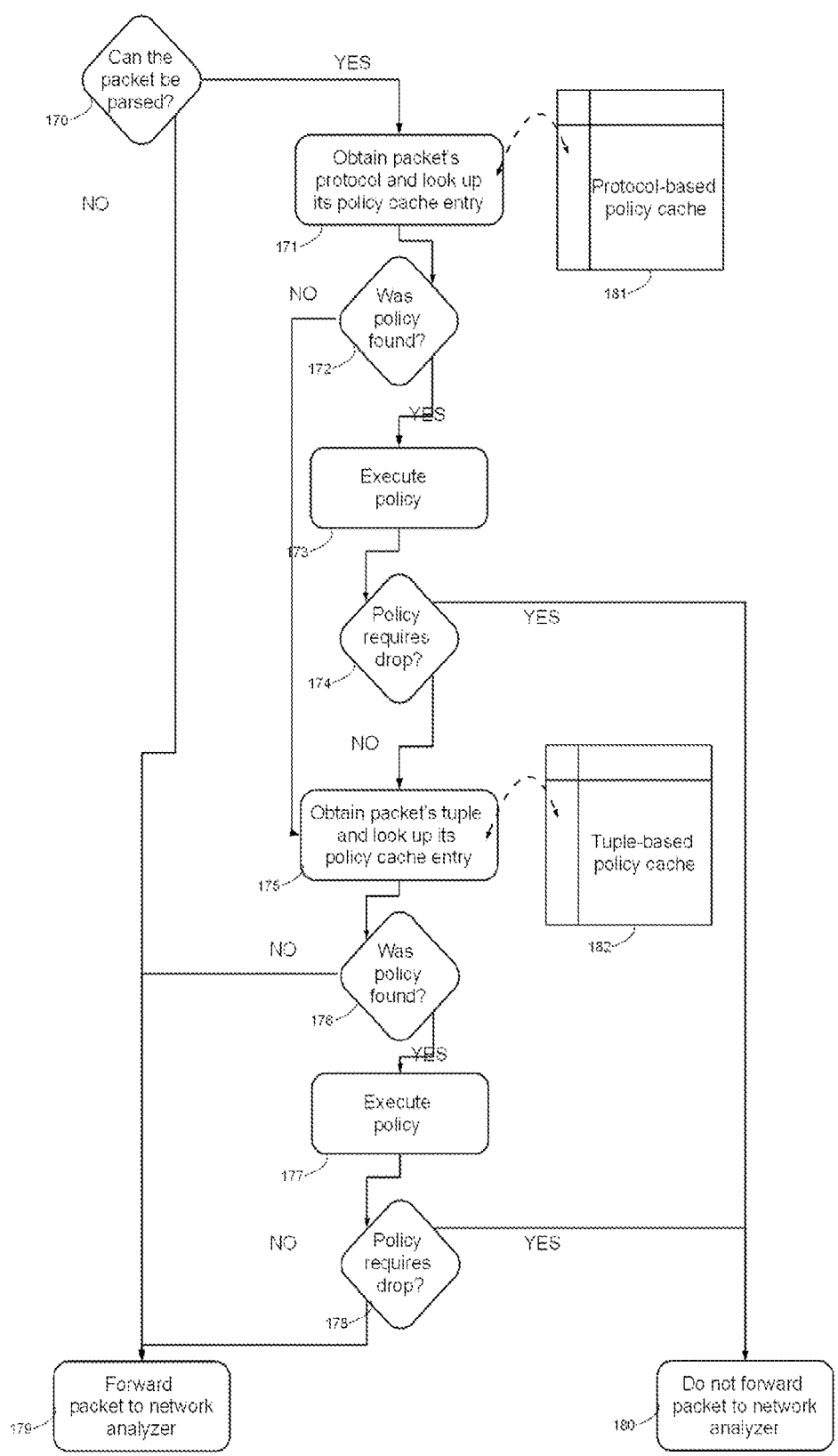
FIG. 9 is a flowchart illustrating a provided method for implementing a level 1 (L1) cache of connection policies according to one provided embodiment.

The flowchart in FIG. 9 assumes the existence of two caches: (1) a protocol-based policy cache (PBPC, 181), which given a protocol type P, returns a policy applicable to any flow conforming to P; and (2) a tuple-based policy cache (TBPC, 182), which given an IP tuple T of the form {IP source and destination addresses, transport source and destination ports, and protocol number}, returns a policy applicable to the flow associated with such tuple T.

The method runs as follows. At 170, upon receiving a packet, it checks if the packet can be parsed. If the packet cannot be parsed, then it is forwarded directly to the network analyzer in 179. Otherwise, at 171, it extracts from the packet its protocol type and looks up the PBPC. If a policy entry was not found in the table at 172, it goes to 175. Otherwise, it executes the policy at 173. If the policy requires it to drop the packet at 174, then it is dropped at 180. Otherwise, it goes to 175. At 175, the method extracts the tuple from the packet and looks up the TBPC in the tuple-based policy cache 182. If a policy is not found at 176, it forwards the packet to the network analyzer at 179. Otherwise, it executes the policy at 177. In some embodiments, on a final check, if the policy requires it to drop the packet at 178, then it is dropped at 180. Otherwise, it is forwarded to the network analyzer at 179.

One advantage of the presented methods and apparatus is that of providing a logical level 1 (L1) caching facility to implement packet policies before the packets reach the network analyzer. If the caches return a policy (cache hit), then such policy can be executed immediately by the dispatcher at 160. Otherwise (cache miss), the packet is handed to the network analyzer, which in all cases has the required information to process the packet. From a performance perspective, this caching facility allows for the offloading of processing cycles from the network analyzer onto the dispatcher. For instance, if the policy states that the packet must be dropped, then such decision can be made up front without the need to involve the network analyzer.

In an exemplary embodiment, a cache miss could occur when the incoming packet is IP fragmented. If the dispatcher does not support IP defragmentation, then it will not be able to compute the tuple of an IP fragmented packet; hence, it will not be able to look up the cache table and retrieve a policy, yielding a cache miss. Another example of cache miss could occur when packets of the same connection arrive out of order. If a policy requires in-order delivery and the dispatcher does not support packet reordering, then such scenario should be treated as a cache miss too. In general, any cache miss can be avoided by adding more functionality to the dispatcher. For instance, these two examples of cache misses could be avoided by implementing the functions of IP defragmentation and packet reordering in the dispatcher. Thus, there exists a natural trade-off between number of cache misses and logical complexity of the dispatcher. In some provided embodiments, IP defragmentation and packet reordering are provided, in others they are not.

Figure 10:
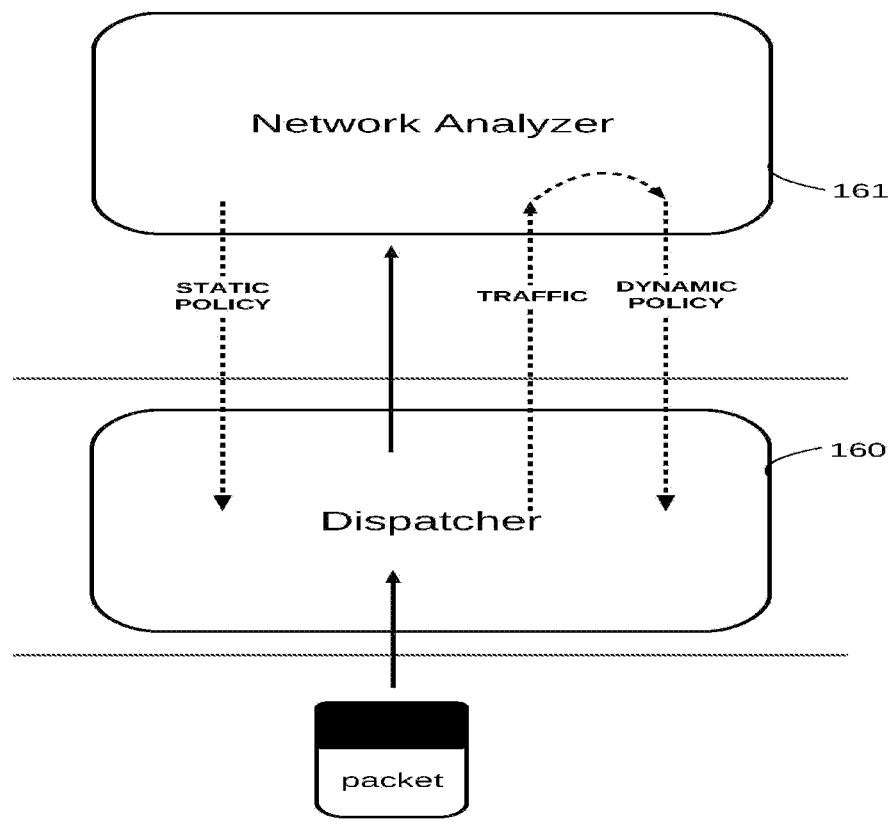
FIG. 10 is a block diagram describing the loading of static and dynamic policies from the network analyzer to the dispatcher consistent with provided embodiments.

In one embodiment, policies are loaded from the network analyzer 161 to the dispatcher 160, as shown in FIG. 10. In this embodiment, there can be two types of policies: static policies, which do not change and do not depend on the input traffic, and dynamic policies, which can change with time and are a function of the input traffic.

Figure 11:
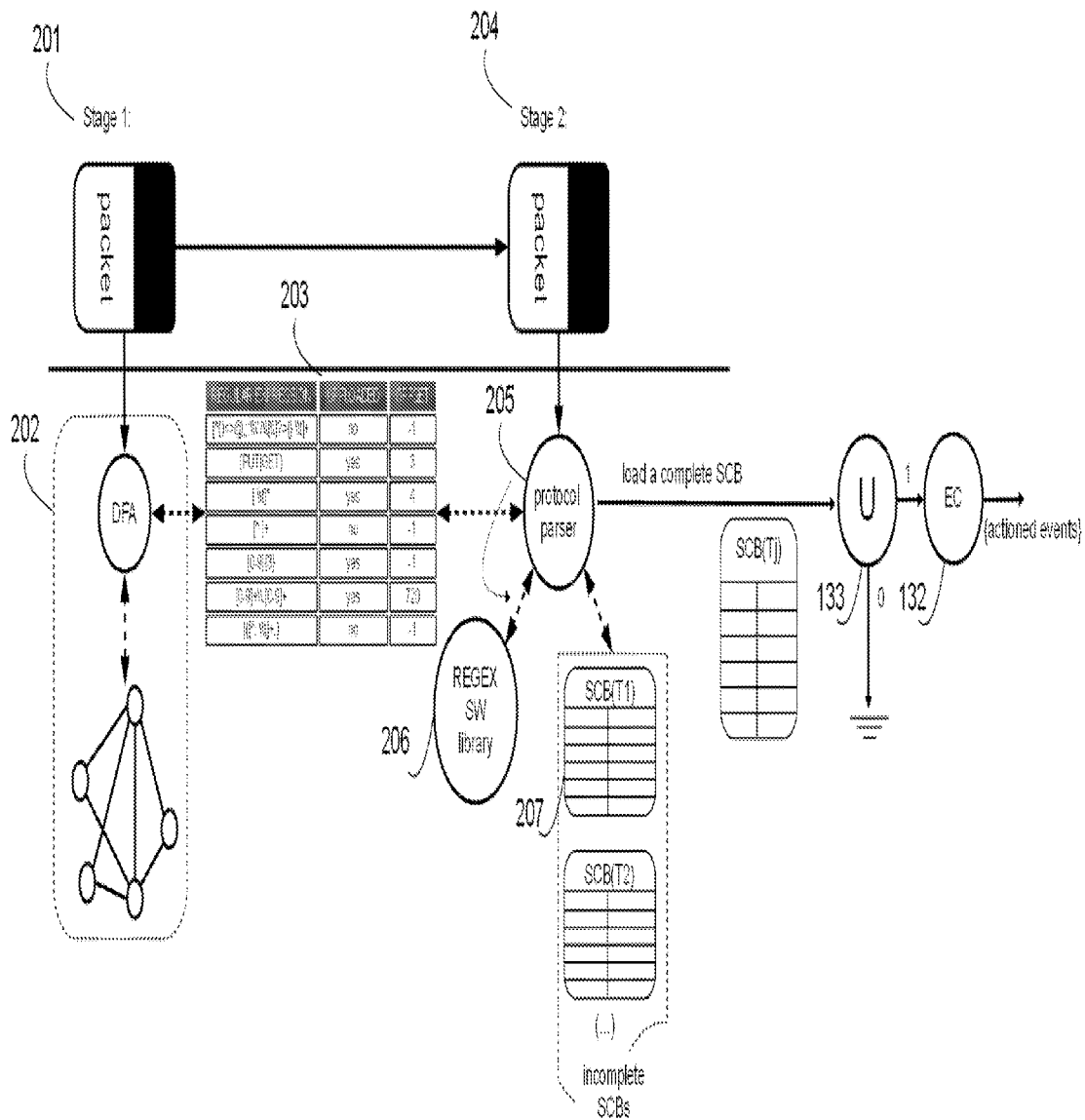
FIG. 11 is a block diagram illustrating some of the components forming one embodiment of a data plane specification of the network analyzer illustrating the extraction of information from the network flows and the processing of events.

FIG. 11 illustrates the flow of a provided method that may be used to implement a portion of the protocol analyzer modules 130 in FIG. 2. In this method, packets are processed via two stages. In the first stage 201, a packet arrives and is first processed by the DFA engines 202. The DFA engines 202 are, in some embodiments, preloaded with DFA specifications corresponding to the set of regular expressions relevant to the analysis; the loading of regular expressions can be done statically or dynamically using the control channels provided in FIG. 10. The DFA engines 202 scan the incoming packet in search for the relevant regular expressions; then, they store the offsets of the found regular expressions in a table of offsets 203. Next, the packet is sent to the second stage 204, where it is thoroughly inspected by a protocol parser 205. In some embodiments, the protocol parser 205 relies on the results of the DFA engines 203 to identify regular expressions within the packet. Upon trying to find a specific regular expression R in a packet, the protocol parser 205 checks the table of offsets 203 previously populated by the DFA engines 203; then, in some embodiments, two cases arise. (1) If no entry is found for regular expression R or if it is found but marked as not offloaded, then the protocol parser 205 falls back to using a software based regular expression library 206 to resolve it.

This could happen for multiple reasons; for instance, in some scenarios the network analyzer compiler 107 in FIG. 1 could decide at compile-time that certain regular expressions cannot be offloaded because they would consume too many resources from the DFA engines 203. (To those skilled in the art, this condition is known as DFA state explosion.) If the entry is found, then the protocol parser 205 uses the offset in the entry to identify the position of the regular expression within the packet. In some embodiments, a negative offset can be used to indicate that the regular expression was not found. The protocol parser 205 gathers information for each flow and, as packets are processed, it stores the results of this analysis in a per-flow status table, referred as the status control block or SCB 207. In FIG. 11, the notation SCB(Ti) refers to the status control block 207 of the connection with IP tuple Ti.

Once a status control block SCB(Tj) 207 is fully completed or the analysis for a connection with tuple Tj is finalized, SCB(Tj) 207 is passed to a module that can resolve all the events/signatures in one single pass. This strategy differs from previous work (N. Schear, D. R. Albrecht, N. Borisov, High-speed Matching of Vulnerability Signatures, Symposium on Recent Advances in Intrusion Detection, September 2008) in that instead of implementing a protocol parser for each even/signature, embodiments of the present invention use a single protocol parser 205 to first extract all the required information and then compute all the signatures at once. This strategy allows for the implementation of the fast and slow path as previously introduced in FIG. 3. In FIG. 11, union 133 implements the union of all the signatures, which can now be resolved with the information provided in SCB(Tj). If the union 133 returns a FALSE statement, then no further analysis is required for this connection; otherwise, SCB(Tj) is passed to an event classifier (the slow path 132), which resolves each signature separately to determine which of them is triggered, leading to the set of specific events that must be invoked.

Figure 12:
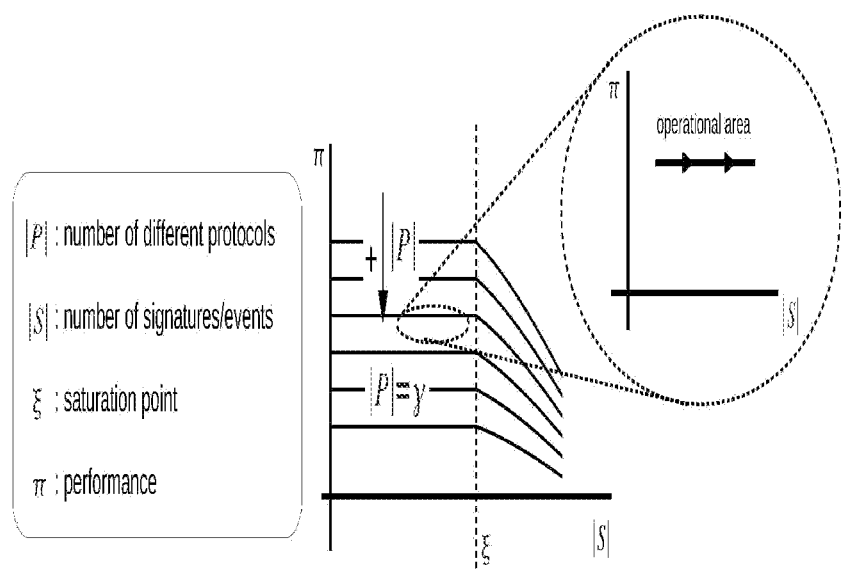
FIG. 12 illustrates how one provided embodiment scales up with the number of signatures and supported protocols.

One advantage of the above method resides in its scalability. FIG. 12 shows how the performance of the system scales up with the number of signatures and protocols supported. The illustration makes an important assumption: that the execution of events is negligible with respect to the end-to-end cost of executing the complete workflow in FIG. 11. This assumption is more likely to be true in systems that focus on the passive analysis of the network traffic (for instance, in intrusion detection systems) and less likely to hold when the system performs heavy duty tasks for each event (for instance, in intrusion detection and prevention systems). It is also most likely to hold for network traffic patterns where flows that generate events occupy a small percentage of the total traffic. Because in some embodiments, each connection is only parsed once, regardless of the number of signatures, the system yields a flat region of operation. Within this region, the performance is invariant with respect to the number of signatures. This flat region has a saturation point, which defines the maximum number of signatures beyond which the performance will start to degrade. As long as the system operates within the flat region, the performance is invariant with respect the number of signatures. The performance also depends on the number of protocols supported, because for each protocol the system will replicate the infrastructure in FIG. 11. As shown, the performance will degrade as the number of protocols increases.

Figure 13:
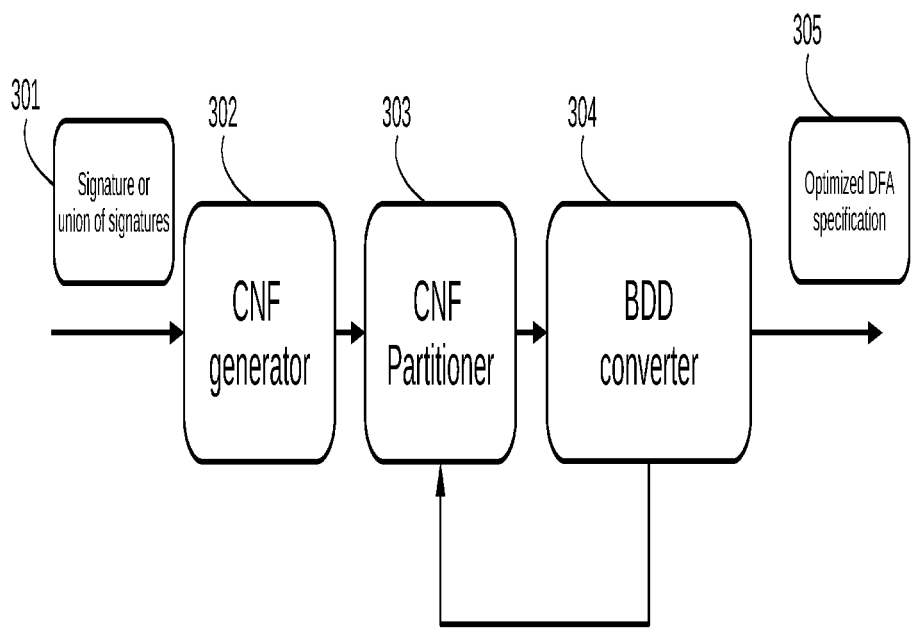
FIG. 13 is a block diagram illustrating a provided process of converting and optimizing a set of signatures representable by Boolean functions into DFA specifications.

In another embodiment of the present invention, a method to generate DFA specifications 305 capable of resolving large number of signatures in parallel is illustrated in FIG. 13. (J. Ros-Giralt, J. Ezick, P. Szilagyi, R. Lethin, High-Speed Parallel Processing of Protocol-Aware Signatures, Thirteenth Annual Workshop of High Performance Embedded Computing, 2009, which is incorporated herein in its entirety.) In this method, a signature is modeled as a Boolean function and the objective is to find a DFA specification than can map such input into N DFA engines, with N larger or equal to 1. A signature or the union of more than one signature 301 is first treated by CNF generator 302, which interprets its input as a Boolean function and converts it into conjunctive normal form (CNF). This CNF expression is then treated by CNF partitioner 303, which partitions it into N smaller CNF expressions following a predefined optimization criteria. The output of this module is then processed by BDD converter 304, which converts each CNF expression into a binary decision diagram (BDD), yielding N BDDs. Since BDDs are a form of DFA specifications 305, this outcome can be directly loaded onto a set of N DFA engines. In some embodiments, the method includes a feedback loop between BDD converter 304 and CNF partitioner 303 to allow for an iterative optimization process in which if the output is not good enough, it can be fed back to the CNF partitioner 303 which can then adjust the partition in search for an optimal outcome. As it will be made evident in the following embodiments, a variety of metrics can be implemented, including but not limited to the maximum number of signatures that can be mapped onto a fixed-size DFA engine or the resulting average throughput of the system.

Figure 15:
FIG. 15 illustrates an example of the CNF representation of a signature and its corresponding BDD as an intermediary stage in the process of generating a DFA specification.

Turning to FIGS. 14, 15, 16, 17, 18 and 19 which describe a reduction to practice of an embodiment of the method presented in FIG. 13. Block 310 in FIG. 14 shows an example of a signature expressed in its Boolean form. The signature is expressed as a function of certain HTTP protocol header fields. Block 311 shows a pseudo-code implementation of the signature using a language called SALT™ which is described in "J. Ezick, Salt 1.5 Closing the Programming Gap for Boolean Satisfiability Solvers", Reservoir White Paper, August 2007, which is incorporated by reference herein in its entirety. In FIG. 15, block 315 shows the CNF representation; this would correspond to an instance of an output of block 302 in FIG. 13. In this block, lines that start with the keyword "c" are comments, and the rest of the lines correspond to the clauses of the CNF. Each integer identifies an input binary variable of the original signature, except for the last integer, which is always 0 and defines the end of a clause, and negative signs represent the negation of a variable. Hence, the CNF expression in block 315 is as follows:

bit1=bit2=bit3=bit4=0; and (bit6∩bit7∩bit9)∪(bit6∩bit7∩bit8)∪
(^bit5∩bit6∩bit9)∪(^bit5∩bit6∩bit8)∪
(bit5∩bit7∩bit9)∪(bit5∩bit7∩bit8), where ∩, ∪ and ^ represent logical operators AND, OR and NEGATION, respectively.

Figure 16:
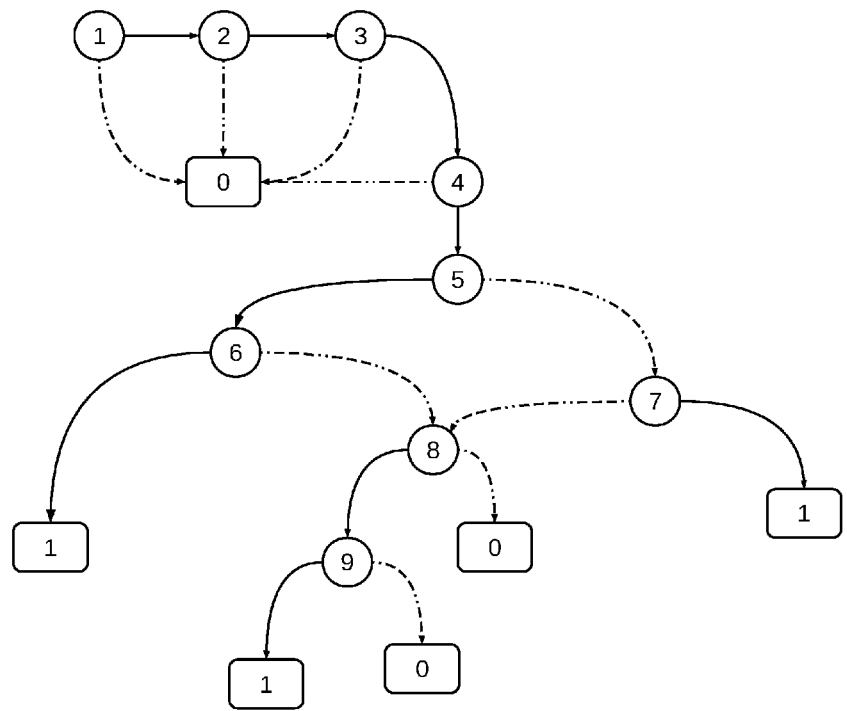
FIG. 16 illustrates a graphical example of a BDD corresponding to a signature as an intermediary stage in the process of generating a DFA specification.
Figure 17:
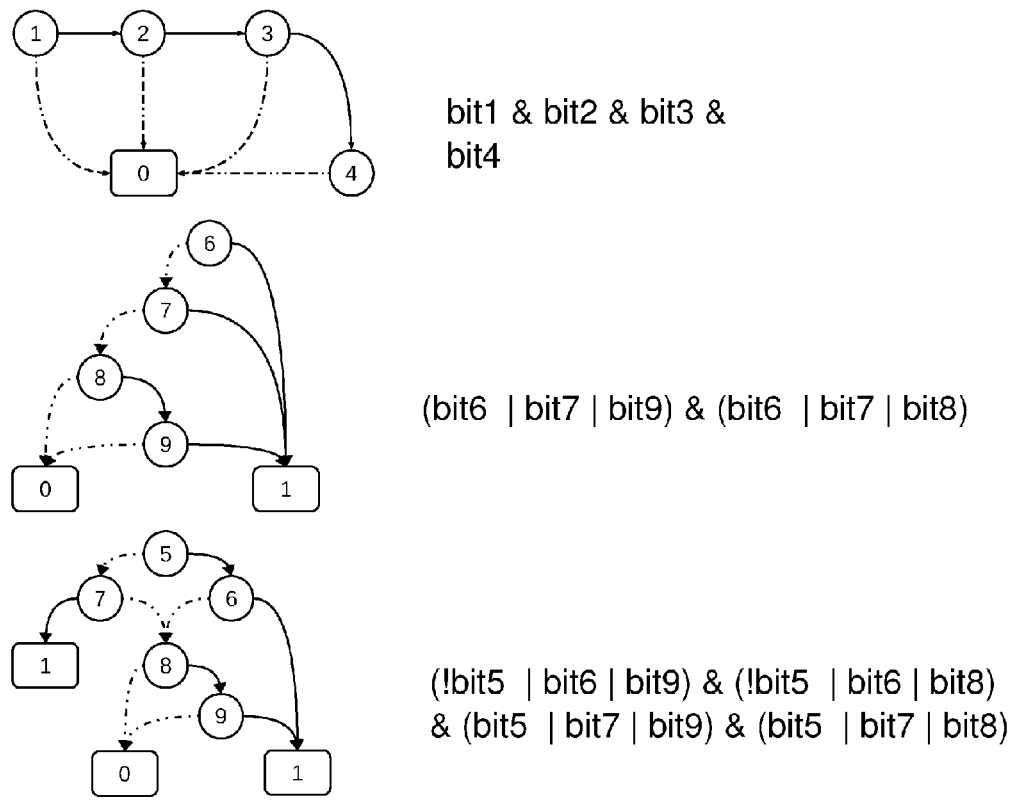
FIG. 17 illustrates a graphical example of a set of min-max optimal BDD partitions corresponding to a complete DFA specification of a signature.

Block 316 in FIG. 15 shows a BDD representation of this CNF expression written in the BuDDy language which is described in J. Lind-Nielsel, "BuDDy: Binary Decision Diagram Package", manual white paper, November 2002. In FIG. 16, a graphical representation of this BDD is presented. Next, suppose that this BDD is to be mapped onto three DFA engines. In this instance, some embodiments follow different optimizations criteria. For instance, FIG. 17 presents a partition of the initial BDD into three smaller BDDs that prove to be min-max, i.e. that the maximum number of nodes of any of the BDDs is minimal. The final DFA specification can be obtained by OR-ing the output of these three BDDs.

Figure 18:
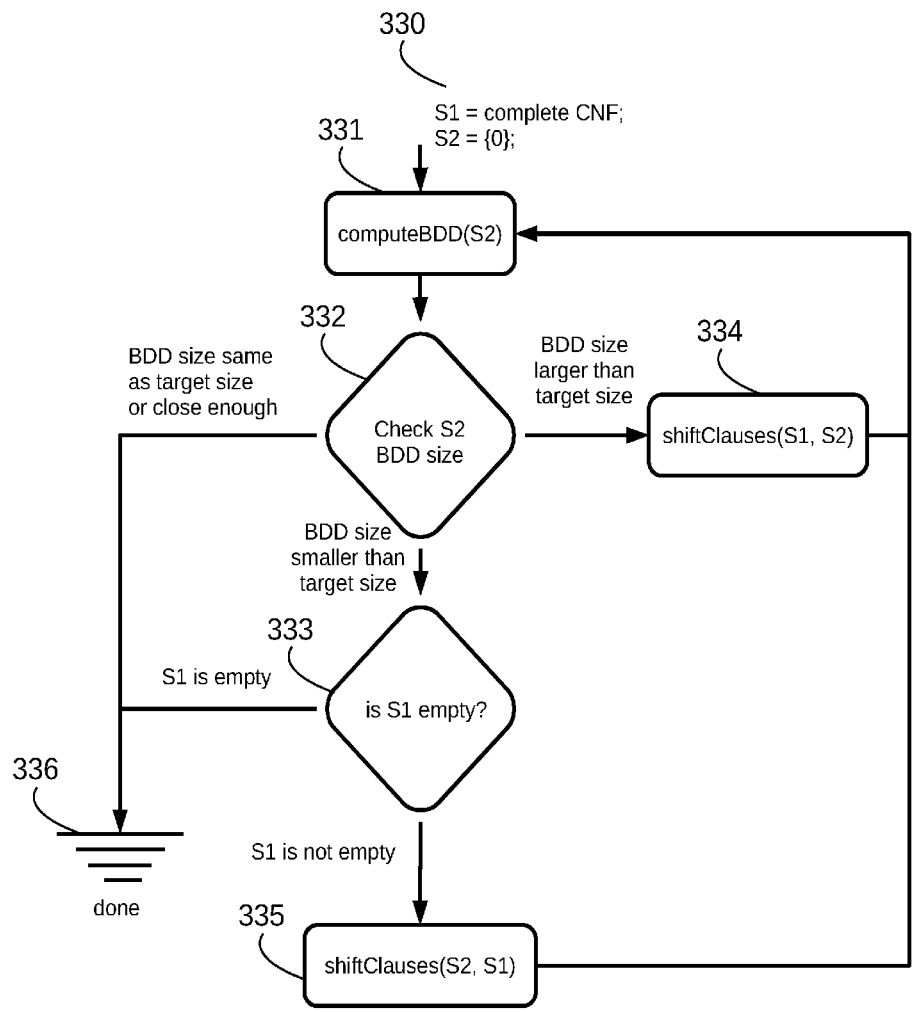
FIG. 18 is a flowchart illustrating a method to optimize BDD partitions for the mapping onto DFA engines.

In another exemplary embodiment, FIG. 18 provides an optimization method for the partitioning of the BDDs based on the following constraints: (1) there exist two DFA engines, represented by E1 and E2; (2) DFA engine E1 has unlimited amount of memory whereas DFA engine E2 has bounded amount of memory; and (3) the usage of DFA engine E2 should be maximal. One embodiment of this configuration corresponds to a host computer configured with a DFA hardware acceleration engine. In this case, E1 could be implemented as a regular expression software library running on the host, which would effectively enjoy unlimited amounts of memory, and E2 would correspond to the hardware DFA engine, with limited amounts of embedded memory.

In FIG. 18, S1 and S2 correspond to the set of clauses of the BDDs that are to be mapped on E1 and E2 respectively, computeBDD(S) is a function that emits a BDD given a CNF expression S, shiftClauses (S1, S2) is a function that moves a subset of clauses from S2 to S1 following a certain optimization criterion, and the target size is defined as the maximum BDD size allowed by E2. The method starts at 330 with S1 being initialized with the complete CNF expression and S2 being empty. First, computeBDD module 331 calculates the BDD for S2. In 332, If its size is equal to the target size or within a tolerance, then the method terminates at 336; else if it is determined in 332 that the size is larger than the target size, at 334 clauses are shifted from S2 to S1 and the method returns to 331; otherwise, the size is smaller and at 333 it is determined if S1 is empty. If it is empty, the method terminates at 336; otherwise, clauses are shifted from S1 to S2 at 335 and the method returns to 331.

Figure 19:
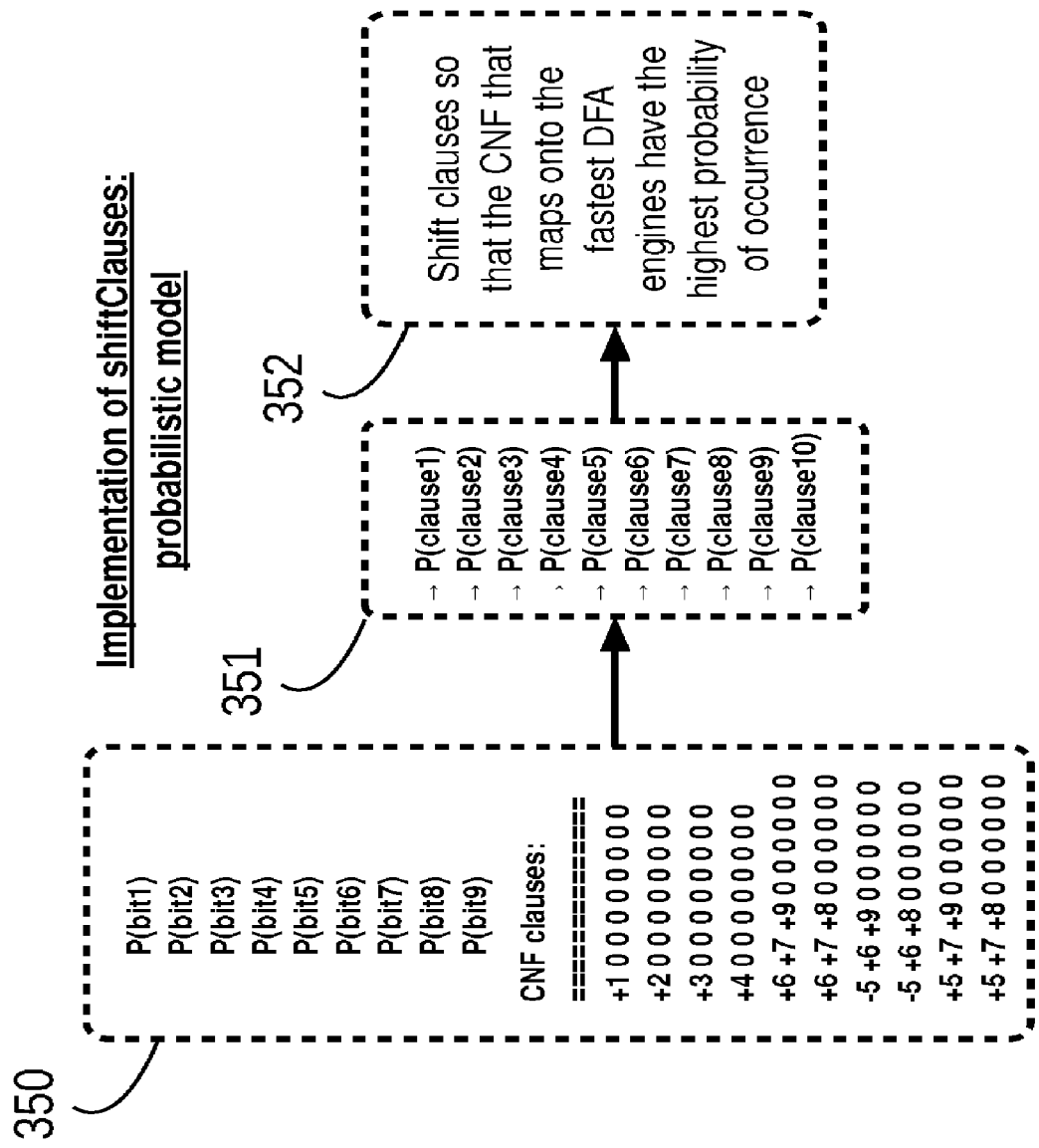
FIG. 19 is a schematic diagram explaining a probabilistic model to optimize the process of mapping signatures onto DFA engines.

FIG. 19 illustrates a provided embodiment of a method for describing the implementation of the function shiftClauses introduced in FIG. 18. At 350, each input binary variable is assigned its probability of occurrence based on empirical analysis of real traffic patterns. For instance, in HTTP traffic, most transactions carry a GET request, so bit1 (FIG. 14) should be expected to have a fairly large probability. Once the probabilities of each variable are assigned, the probability of each clause P(clause-i) is calculated at 351. At 352 the function shiftClauses uses this information to ensure that those clauses that have the highest probability of being true are mapped onto those DFA engines that are faster. For instance in the embodiment presented in FIG. 18, E2 is faster than E1, hence shiftClauses aims at offloading those clauses that have the highest probability onto E2. By doing so, the probability that E2 returns a true statement is maximized, which minimizes the number of times that E1 needs to be invoked (notice that E1 only needs to be invoked when E2 returns zero).

In yet another provided embodiment, the logic order of the systems presented in FIGS. 14, 15, 16, 17, 18 and 19 are reversed, producing different sets of DFA specifications that are logically equivalent.

Figure 20:
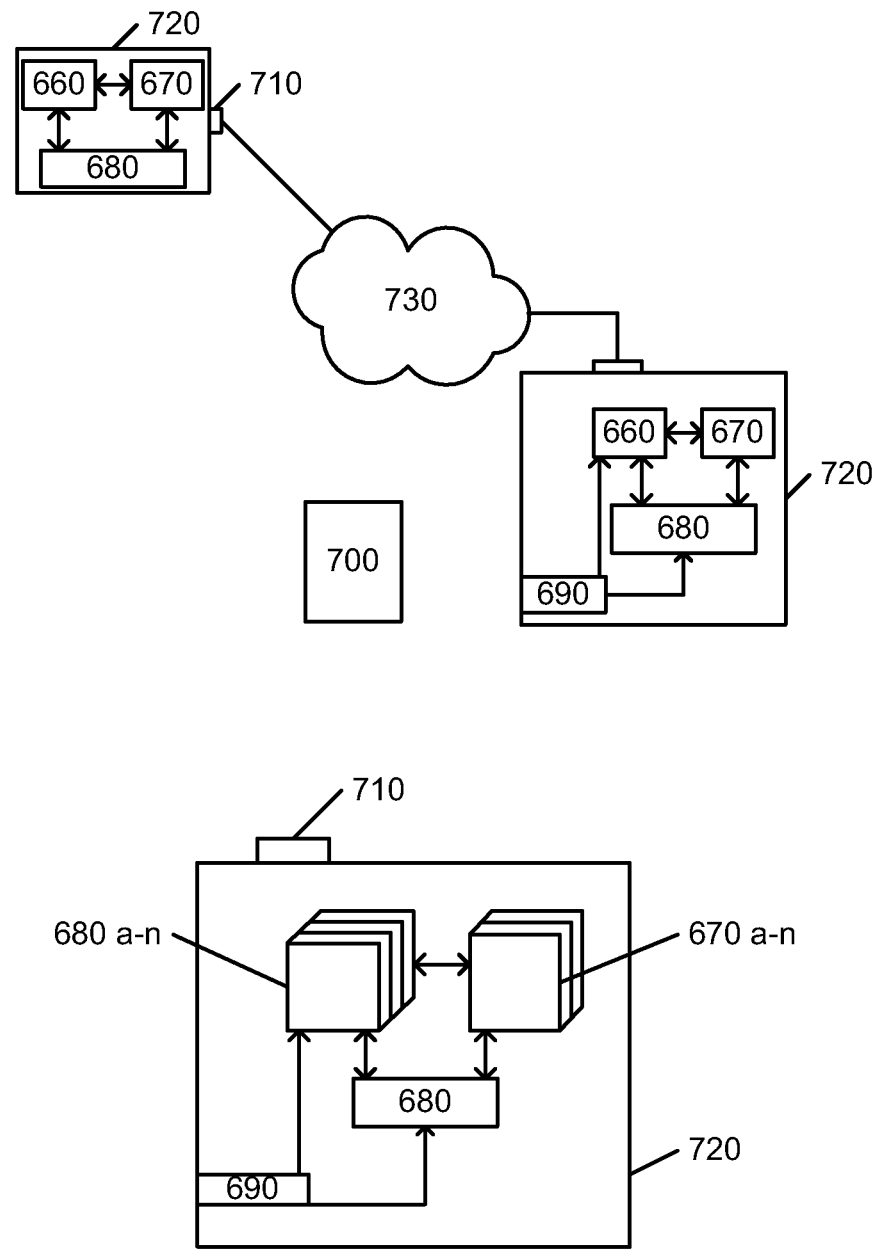
FIG. 20 illustrates a custom computing apparatus and computer software product consistent with provided embodiments.

Illustrated in FIG. 20 are computing apparatus and computer software products consistent with provided embodiments. Computing apparatus 720 includes processor 660, memory 670, storage medium 680, and in some embodiments input port 690 and network interface 710. In many provided embodiments, non-transitory storage medium 680 contains a set of processor executable instructions that when executed by processor 660 configure computing apparatus 720 to implement the modules and methods described herein. In one embodiment, storage medium 680, containing the set of processor executable instructions resides in another computing apparatus 720 across network 730. In an embodiment of a computer software product, computer software product 700 is a computer readable storage medium containing processor executable instructions sufficient that when executed by processor 660 configure computing apparatus 720 to implement the above described modules and methods. Further, computer software product, in some embodiments consists of a physical medium configured to interface with input port 690 to allow its contents to be copied to storage medium 680. In other embodiments, computer software product 700 is an internal storage medium, such as 680. An additional embodiment of computing apparatus 720 includes a plurality of processors 680(*a-n*), a plurality of memories 670(*a-n*), a storage medium 680 and in some embodiments input port 690 and network connection 710. In some embodiments, one or more processors 680(*a-n*) is a host, while others are modeled in the form of a grid.

Thus, it is seen that methods apparatus and computer software products for implementation of high-speed network analyzers is provided. One skilled in the art will appreciate that embodiments of the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method of analyzing data in a communication device comprising:
   receiving, at a protocol input interface, a protocol specification comprising human readable grammar;
   receiving, at an event interface, an event specification;

deriving, in a network analyzer compiler module configured for translating the protocol and event specifications into executable code for a hardware platform, a data plane specification from the protocol specification and the event specification; and outputting the data plane specification to a data plane module, wherein:

the data plane specification comprises a plurality of target events and the data plane module groups the target events into a fast path and a slow path and wherein the fast path implements a logical OR of at least two of the plurality of target events and the slow path implements each of the plurality of target events individually, each target event comprising at least one signature and the logical OR comprises a logical OR of at least two different signatures;

the data plane module comprises a Discrete Finite Automata engine; and deriving the data plane specification comprising:
(a) translating a Boolean signature into its conjunctive normal form expression;
(b) partitioning, according to a first optimization criterion, the conjunctive normal form expression into a multiplicity of conjunctive normal form sub-expressions;
(c) converting the multiplicity of conjunctive normal form sub-expressions into binary decision diagrams; and
(d) representing the binary decision diagrams as Discrete Finite Automata specifications.

2. The method of claim 1, wherein the event specification comprises at least one target signature and an action to be invoked when the at least one target signature is triggered.

3. The method of claim 2, wherein the event specification is derived by receiving, at a signature generation module, a first communication packet;
tracing, by the signature generation module, an action triggered by the first communication packet; and
deriving a signature from the trace, wherein the signature comprises a function that is configured to receive second communication packet as an input.

4. The method of claim 3, wherein the function is a Boolean function and is further configured to return a TRUE value if one of the at least one target signatures are present in the second communication packet.

5. The method of claim 3, wherein the derivation of the event specification further comprises translating the function, in a source to source signature compiler, in to an equivalent signature compatible with a computer compiler system.

6. The method of claim 5, wherein the deriving a data plane specification further comprises packing, in an event packing module, at least one equivalent signature with the action to be invoked when the at least one equivalent signature is triggered.

7. The method of claim 1, wherein the protocol specification comprises a specification expressed in a high-level protocol specification language.

8. The method of claim 1, wherein the deriving a data plane specification further comprises scanning the protocol specification and the event specification for regular expressions and generating statements in the data plane specification that assign the regular expressions to a specialized regular expression processing engine.

9. The method of claim 1, wherein the deriving a data plane specification further comprises scanning the protocol specification and the event specification for regular expressions and generating statements in data plane specification that are capable of software processing the regular expressions.

10. The method of claim 1, wherein the data plane module comprises a component selected from a group consisting of: a Field Programmable Gate Array, a General Purpose Processor, and an Application Specific Integrated Circuit.

11. The method of claim 1, further comprising
(e) evaluating the Discrete Finite Automata specification against a second optimization criterion; and
(f) iterating (a) through (e) until the evaluation is satisfactory.

12. The method of claim 1, wherein the partitioning comprises computing a set of binary decision diagrams such that the number of nodes of the largest binary decision diagram is minimized.

13. The method of claim 1, wherein the partitioning utilizes probabilities of occurrence of each bit of the input Boolean signatures to maximize the average throughput of the system.

14. The method of claim 1, wherein the data plane module comprises a dispatcher module and a network analyzer module.

15. The method of claim 14, wherein the dispatcher module and the network analyzer module share control information through a common storage facility.

16. The method of claim 15, wherein the common storage facility comprises a structure selected from a group consisting: of a memory cache, a hash table, a bloom filter, a list, and a binary tree.

17. The method of claim 15, further comprising:
receiving at least one data packet;
defining a pointer to one of the at least one data packet; and
using the pointer to store data related to the packet in the common storage facility.

18. The method of claim 17, further comprising using the pointer to fetch data related to the packet from the common storage facility.

19. The method of claim 15 further comprising receiving a data packet and storing a record in the storage facility, the record comprising information shared between the dispatcher module and the network analyzer module, the shared information comprising an offset of a regular expression within the data packet, obtained by the network analyzer module.

20. A custom analysis apparatus comprising:
a processor; and a memory communicating with the processor, the memory containing a set of processor executable instruction that, when executed by the processor configure the custom analysis apparatus to:
receive, at a protocol input interface, a protocol specification comprising human readable grammar;
receive, at an event interface, an event specification;
derive, in a network analyzer compiler module configured for translating the protocol and event specifications into executable code for a hardware platform, a data plane specification from the protocol specification and the event specification; and
output the data plane specification to a data plane module comprising a Discrete Finite Automata engine, wherein the data plane specification comprises a plurality of target events and the data plane module groups the target events into a fast path and a slow path and wherein the fast path implements a logical OR of at least two of the plurality of target events and the slow path implements each of the plurality of target events individually, each target event comprising at least one signature and the logical OR comprises a logical OR of at least two different signatures, wherein the configuration to derive the data plane specification comprises a configuration to:
(a) translate a Boolean signature into its conjunctive normal form expression;
(b) partition, according to a first optimization criterion, the conjunctive normal form expression into a multiplicity of conjunctive normal form sub-expressions;
(c) convert the multiplicity of conjunctive normal form sub-expressions into binary decision diagrams; and
(d) represent the binary decision diagrams as Discrete Finite Automata specifications.

21. The custom analysis apparatus of claim 20, wherein the event specification comprises at least one target signature and an action to be invoked when the at least one target signature is triggered.

22. The custom analysis apparatus of claim 21, wherein the configuration to derive an event specification is a configuration to receive, at a signature generation module, a first communication packet;
trace by the signature generation module, an action triggered by the first communication packet; and
derive a signature from the trace, wherein the signature comprises a function that is configured to receive second communication packet as an input.

23. The custom analysis apparatus of claim 22, wherein the function is a Boolean function and is further configured to return a TRUE value if one of the at least one target signatures are present in the second communication packet.

24. The custom analysis apparatus of claim 22, wherein the configuration to derive the event specification further comprises a configuration to translate the function, in a source to source signature compiler, into an equivalent signature compatible with a computer compiler system.

25. The custom analysis apparatus of claim 24, wherein the configuration to derive a data plane specification further comprises a configuration to pack, in an event packing module, at least one equivalent signature with the action to be invoked when the at least one equivalent signature is triggered.

26. The custom analysis apparatus of claim 20, wherein the protocol specification comprises a specification expressed in a high-level protocol specification language.

27. The custom analysis apparatus of claim 20, wherein the configuration to derive a data plane specification further comprises a configuration to scan the protocol specification and the event specification for regular expressions and generate statements in the data plane specification that assign the regular expressions to a specialized regular expression processing engine.

28. The custom analysis apparatus of claim 20, wherein the configuration to derive a data plane specification further comprises a configuration to scan the protocol specification and the event specification for regular expressions and generate statements in data plane specification that are capable of software processing the regular expressions.

29. The custom analysis apparatus of claim 20, wherein the data plane module comprises a component selected from a group consisting of: a Field Programmable Gate Array, a General Purpose Processor, and an Application Specific Integrated Circuit.

30. The custom analysis apparatus of claim 20, wherein the configuration further comprises a configuration to
(e) evaluate the Discrete Finite Automata specification against a second optimization criterion; and
(f) iterate (a) through (e) until the evaluation is satisfactory.

31. The custom analysis apparatus of claim 20, wherein the configuration to partition comprises a configuration to compute a set of binary decision diagrams such that the number of nodes of the largest binary decision diagram is minimized.

32. The custom analysis apparatus of claim 20, wherein the configuration to partition utilizes probabilities of occurrence of each bit of the input Boolean signatures to maximize the average throughput of the system.

33. The custom analysis apparatus of claim 20, wherein the data plane module comprises a dispatcher module and a network analyzer module.

34. The custom analysis apparatus of claim 33, wherein the dispatcher module and the network analyzer module share control information through a common storage facility.

35. The custom analysis apparatus of claim 34, wherein the common storage facility comprises a structure selected from a group consisting: of a memory cache, a hash table, a bloom filter, a list, and a binary tree.

36. The custom analysis apparatus of claim 34, wherein the configuration further comprises a configuration to:
receive at least one data packet;
define a pointer to one of the at least one data packet; and
use the pointer to store data related to the packet in the common storage facility.

37. The custom analysis apparatus of claim 36, wherein the configuration further comprises a configuration to use the pointer to fetch data related to the packet from the common storage facility.

38. The custom analysis apparatus of claim 34, wherein the configuration further comprises a configuration to receive a data packet and store a record in the storage facility, the record comprising information shared between the dispatcher module and the network analyzer module, the shared information comprising an offset of a regular expression within the data packet, obtained by the network analyzer module.

39. An article of manufacture comprising
a non-transitory computer readable medium containing a set of processor executable instructions, which, when executed by a processor configure a analysis apparatus comprising the processor to:
receive, at a protocol input interface, a protocol specification comprising human readable grammar;
receive, at an event interface, an event specification;
derive, in a network analyzer compiler module configured for translating the protocol and event specifications into executable code for a hardware platform, a data plane specification from the protocol specification and the event specification; and
output the data plane specification to a data plane module comprising a Discrete Finite Automata engine, wherein the data plane specification comprises a plurality of target events and the data plane module groups the target events into a fast path and a slow path and wherein the fast path implements a logical OR of at least two of the plurality of target events and the slow path implements each of the plurality of target events individually, each target event comprising at least one signature and the logical OR comprises a logical OR of at least two different signatures,
wherein the configuration to derive the data plane specification comprises a configuration to:
(a) translate a Boolean signature into its conjunctive normal form expression;
(b) partition, according to a first optimization criterion, the conjunctive normal form expression into a multiplicity of conjunctive normal form sub-expressions;
(c) convert the multiplicity of conjunctive normal form sub-expressions into binary decision diagrams; and (d) represent the binary decision diagrams as Discrete Finite Automata specifications.

40. The article of manufacture of claim 39, wherein the event specification comprises at least one target signature and an action to be invoked when the at least one target signature is triggered.

41. The article of manufacture of claim 40, wherein the configuration to derive an event specification is a configuration to receive, at a signature generation module, a first communication packet;
   trace; by the signature generation module, an action triggered by the first communication packet; and
   derive a signature from the trace, wherein the signature comprises a function that is configured to receive second communication packet as an input.

42. The article of manufacture of claim 41, wherein the function is a Boolean function and is further configured to return a TRUE value if one of the at least one target signatures are present in the second communication packet.

43. The article of manufacture of claim 41, wherein the configuration to derive the event specification further comprises a configuration to translate the function, in a source to source signature compiler, in to an equivalent signature compatible with a computer compiler system.

44. The article of manufacture of claim 43, wherein the configuration to derive a data plane specification further comprises a configuration to pack, in an event packing module, at least one equivalent signature with the action to be invoked when the at least one equivalent signature is triggered.

45. The article of manufacture of claim 39, wherein the protocol specification comprises a specification expressed in a high-level protocol specification language.

46. The article of manufacture of claim 39, wherein the configuration to derive a data plane specification further comprises a configuration to scan the protocol specification and the event specification for regular expressions and generate statements in the data plane specification that assign the regular expressions to a specialized regular expression processing engine.

47. The article of manufacture of claim 39, wherein the configuration to derive a data plane specification further comprises a configuration to scan the protocol specification and the event specification for regular expressions and generate statements in data plane specification that are capable of software processing the regular expressions.

48. The article of manufacture of claim 39, wherein the data plane module comprises a component selected from a group consisting of: a Field Programmable Gate Array, a General Purpose Processor, and an Application Specific Integrated Circuit.

49. The article of manufacture of claim 39, wherein the configuration further comprises a configuration to
   (e) evaluate the Discrete Finite Automata specification against a second optimization criterion; and
   (f) iterate (a) through (e) until the evaluation is satisfactory.

50. The article of manufacture of claim 39, wherein the configuration to partition comprises a configuration to compute a set of binary decision diagrams such that the number of nodes of the largest binary decision diagram is minimized.

51. The article of manufacture of claim 39, wherein the configuration to partition utilizes probabilities of occurrence of each bit of the input Boolean signatures to maximize the average throughput of the system.

52. The article of manufacture of claim 39, wherein the data plane module comprises a dispatcher module and a network analyzer module.

53. The article of manufacture of claim 52, wherein the dispatcher module and the network analyzer module share control information through a common storage facility.

54. The article of manufacture of claim 53, wherein the common storage facility comprises a structure selected from a group consisting: of a memory cache, a hash table, a bloom filter, a list, and a binary tree.

55. The article of manufacture of claim 53, wherein the configuration further comprises a configuration to:
   receive at least one data packet;
   define a pointer to one of the at least one data packet; and
   use the pointer to store data related to the packet in the common storage facility.

56. The article of manufacture of claim 55, wherein the configuration further comprises a configuration to use the pointer to fetch data related to the packet from the common storage facility.

57. The article of manufacture of claim 53, wherein the configuration further comprises a configuration to receive a data packet and store a record in the storage facility, the record comprising information shared between the dispatcher module and the network analyzer module, the shared information comprising an offset of a regular expression within the data packet, obtained by the network analyzer module.

* * * * *